US012664485B2

(12) United States Patent
Tveit et al.

(10) Patent No.: US 12,664,485 B2
(45) Date of Patent: Jun. 23, 2026

(54) MEASURING PROBABILITY OF INFLUENCE USING MULTI-DIMENSIONAL STATISTICS ON DEEP LEARNING EMBEDDINGS

(71) Applicant: Microsoft Technology Licensing, LLC, Redmond, WA (US)

(72) Inventors: Amund Tveit, Trondheim (NO); Kateryna Solonko, Oslo (NO); Zoran Hranj, Oslo (NO); Aleksander Øhrn, Oslo (NO); Roman Werpachowski, Arneberg (NO); Mohammadreza Bonyadi, Trondheim (NO); Arun Shankar Iyer, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 819 days.

(21) Appl. No.: 18/049,598

(22) Filed: Oct. 25, 2022

(65) Prior Publication Data

US 2024/0135105 A1    Apr. 25, 2024
US 2024/0232535 A9    Jul. 11, 2024

(51) Int. Cl.
*G06F 40/30* (2020.01)
*G06N 3/08* (2023.01)

(52) U.S. Cl.
CPC ............... *G06F 40/30* (2020.01); *G06N 3/08* (2013.01)

(58) Field of Classification Search
CPC ................................. G06F 40/30; G06V 20/41
See application file for complete search history.

(56) References Cited

U.S. PATENT DOCUMENTS 10,134,046 B2    11/2018    Bania et al.
10,169,419 B2    1/2019    Alonso et al.
(Continued)

FOREIGN PATENT DOCUMENTS

CN        107909119 A        4/2018
CN        112487823 A        3/2021
(Continued)

OTHER PUBLICATIONS

Feng, et al., "Inf2vec: Latent Representation Model for Social Influence Embedding," 2018 IEEE 34th International Conference on Data Engineering. (Year: 2018).*
(Continued)

*Primary Examiner* — Feng-Tzer Tzeng
(74) *Attorney, Agent, or Firm* — Foley IP Law, PLLC

(57) ABSTRACT

The disclosure herein describes a system for measuring probability of influence in digital communications to determine if communication content originated in a person's own prior knowledge or new information more recently obtained from interaction with communications of others. An estimated probability a new communication by a first user comes from the same distribution as prior communications of the first user are generated using multidimensional statistics on embeddings representing the communications. A second estimated probability that the new communication comes from the same distribution as communication(s) of a second user that were accessible to the first user are generated. If the second probability is greater than the first probability, the new communication is more likely influenced by exposure of the first user to the second user's communications rather than the first user's own historical knowledge. An influence attribution recommendation is generated, including an influence attribution or other recommended action.

20 Claims, 20 Drawing Sheets

700

(56) References Cited

U.S. PATENT DOCUMENTS

| | | | | |
|---|---|---|---|---|
| 10,284,601 | B1 * | 5/2019 | Bar-Menachem | G07G 3/00 |
| 2013/0117364 | A1 * | 5/2013 | Bania | G06Q 30/02 |
| | | | | 709/204 |
| 2013/0166540 | A1 | 6/2013 | Ganesh | |
| 2013/0262097 | A1 | 10/2013 | Ivanou | |
| 2015/0058277 | A1 | 2/2015 | Ioannidis | |
| 2018/0046724 | A1 | 2/2018 | Liu | |
| 2021/0295357 | A1 | 9/2021 | Cleaver | |
| 2022/0156992 | A1 * | 5/2022 | Harikumar | G06T 7/11 |
| 2023/0140125 | A1 * | 5/2023 | Glesinger | G06N 3/08 |
| | | | | 704/9 |

FOREIGN PATENT DOCUMENTS

| | | | | | |
|---|---|---|---|---|---|
| CN | 111832924 | B | * | 6/2021 | G06F 16/367 |
| CN | 114267001 | A | | 4/2022 | |

OTHER PUBLICATIONS

International Preliminary Report on Patentability Chapter 1 received for PCT Application No. PCT/US23/032813, mailed on May 8, 2025, 10 pages.

Anonymous: "Semantic Similarity", Wikipedia, Jul. 26, 2022, pp. 1-11, XP093105986, retrieved from the Internet: URL: https://en.wikipedia.org/w/index.php?title=Semantic_similarity&oldid=1100493162 [retrieved on Nov. 27, 2023] Natural language processing (NLP) p. 2-p. 3.

Anonymous: "Word Embedding", Wikipedia, Dec. 7, 2020, pp. 1-7, XP055901294, retrieved from the Internet: URL: https://en.wikipedia.org/w/index.php?title=Word_embedding&oldid=992864235 [retrieved on Mar. 15, 2022].

Chandrasekaran, et al., "Evolution of Semantic Similarity—A Survey", ACM Computing Surveys, ACM, New York, NY, US, vol. 54, No. 2, Feb. 18, 2021, pp. 1-37, XP058673974, the whole document.

Dugar, et al., "Hyperparameter Tuning for Enhanced Authorship Identification Using Deep Neural Networks", Proceeding of the 3rd International Conference on Trends in Electronics and Informatics (ICOEI 2019), IEEE, Apr. 23, 2019, pp. 206-211, XP033627402.

Gupta, et al., "Authorship Identification using Recurrent Neural Networks", Proceedings of the 3rd International Conference on Information System and Data Mining (ICISDM 2019), Apr. 6, 2019, pp. 133-137, XP093106166.

International Search Report and Written Opinion received for PCT Application No. PCT/US2023/032813, mailed on Dec. 7, 2023, 21 pages.

Liu, et al., "Calculating Semantic Similarity between Academic Articles using Topic Event and Ontology", arxiv.org, Cornell University Library, 201 Olin Library Cornell University Ithaca, NY 14853, Nov. 30, 2017, pp. 1-21, XP081298738.

Mohebbi, et al., "Computing Semantic Similarity of Texts Based on Deep Graph Learning with Ability to use Semantic Role Label Information", Scientific Reports, vol. 12, No. 14777, Aug. 30, 2022, pp. 1-11, XP093106157.

Rosin, et al., "Generating Timelines by Modeling Semantic Change", arxiv.org, Cornell University Library, 201 Olin Library Cornell University Ithaca, NY 14853, Sep. 21, 2019, 10 pages.

Talati, et al., "Deep Learning based Authorship Identification", Experiment Findings, Aug. 25, 2020, 7 pages, XP093106165.

Verma, et al., "Semantic Similarity between Short Paragraphs using Deep Learning", 2020 IEEE International Conference on Electronics, Computing and Communication Technologies (CONECCT), IEEE, Jul. 2, 2020, pp. 1-5.

Vrbanec, et al., "The Struggle with Academic Plagiarism: Approaches based on Semantic Similarity", 2017 40th International Convention on Information and Communication Technology, Electronics and Microelectronics (MIPRO), Croatian Society MIPRO, May 22, 2017, pp. 870-875, XP033118734.

Zad, et al., "A Survey of Deep Learning Methods on Semantic Similarity and Sentence Modeling", 2021 IEEE 12th Annual Information Technology, Electronics and Mobile Communication Conference (IEMCON), IEEE, Oct. 27, 2021, pp. 466-472.

Tonneyck, Reony, "Auto layout Figma notifications", Retrieved from: https://www.uxcrush.com/auto-layout-figma-notifications/, Retrieved on: May 18, 2022, 2 Pages.

"Detecting Fake Influencers: Everything You Should Know About Influencer Fraud", Retrieved from: https://influencity.com/blog/en/detecting-fake-influencers-everything-you-should-know-about-influencer-fraud/, Feb. 1, 2019, 16 Pages.

"Digital influencer", Retrieved from: https://en.wikipedia.org/wiki/Digital_influencer, Jan. 13, 2022, 1 Page.

"Help:Page history", Retrieved from: https://en.wikipedia.org/wiki/Help:Page_history, Sep. 21, 2022, 6 Pages.

"HITS Algorithm", Retrieved from: https://en.wikipedia.org/wiki/HITS_algorithm, Aug. 26, 2022, 5 Pages.

"Influencer marketing", Retrieved from: https://en.wikipedia.org/wiki/Influencer_marketing, Sep. 22, 2022, 12 Pages.

"Node Representation Learning", Retrieved from: https://web.archive.org/web/20220127163538/https:/snap-stanford.github.io/cs224w-notes/machine-learning-with-networks/node-representation-learning, Jan. 27, 2022, 4 Pages.

"Notification", Retrieved from: https://web.archive.org/web/20200912052623/https:/dribbble.com/tags/notification, Sep. 12, 2020, 83 Pages.

"PageRank", Retrieved from: https://en.wikipedia.org/wiki/PageRank, Oct. 7, 2022, 15 Pages.

Munroe, Lee, "Push Notification UI Kit iOS, Android, Chrome, Firefox, Windows", Retrieved from: https://www.figma.com/community/file/852038744760148547, Jun. 5, 2022, 3 Pages.

"Six degrees of separation", Retrieved from: https://en.wikipedia.org/wiki/Six_degrees_of_separation, Sep. 24, 2022, 12 Pages.

"What Is a Nano-Influencer", Retrieved from: https://web.archive.org/web/20220314121443/https:/brandmentions.com/wiki/What_Is_a_Nano-Influencer, Mar. 14, 2022, 4 Pages.

"Wireframing Academy", Retrieved from: https://web.archive.org/web/20220523001126/https:/balsamiq.com/learn/articles/button-design-best-practices/, May 23, 2022, 13 Pages.

"XTREME (research.google)", Retrieved from: https://web.archive.org/web/20220506100059/https:/sites.research.google/xtreme, May 6, 2022, 2 Pages.

Ahmad, et al., "Missing Link Prediction using Common Neighbor and Centrality based Parameterized Algorithm", In Journal of Scientific Report, vol. 10, Jan. 15, 2020, 9 Pages.

Alvi, et al., "Using DeepSpeed and Megatron to Train Megatron-Turing NLG 530B, the World's Largest and Most Powerful Generative Language Model—Microsoft Research", Retrieved from: https://www.microsoft.com/en-us/research/blog/using-deepspeed-and-megatron-to-train-megatron-turing-nlg-530b-the-worlds-largest-and-most-powerful-generative-language-model/, Oct. 11, 2021, 9 Pages.

Ansari, et al., "A Graph Based Approach for Effective Influencer Marketing", In International Journal of Data Mining & Knowledge Management Process (IJDKP) vol. 9, Issue 4, Jul. 2019, pp. 21-37.

Biswas, et al., "Mining the "Influencers" using Graph Neural Networks (GNN)", Retrieved from: https://prasunbiswas90.medium.com/mining-the-influencers-using-graph-neural-networks-gnn-cbd4d7965c2e, Dec. 14, 2020, 8 Pages.

Bjelland, et al., "Eigenvectors of directed graphs and importance scores: Dominance, T-Rank, and sink remedies", In Journal of Data Mining and Knowledge Discovery, vol. 20, Issue 1, Oct. 16, 2009, 54 Pages.

Cerullo, Megan, "Influencer marketing fraud will cost brands $1.3 billion in 2019", Retrieved from: https://www.cbsnews.com/news/influencer-marketing-fraud-costs-companies-1-3-billion/, Jul. 25, 2019, 6 Pages.

Feng, et al., "An expert with whom I can identify: The role of narratives in influencer marketing", In International Journal of Advertising, vol. 40, Issue 7, Oct. 20, 2020, 24 Pages.

Goodrow, Cristos, "On YouTube's recommendation system", Retrieved from: https://blog.youtube/inside-youtube/on-youtubes-recommendation-system/, Sep. 15, 2021, 15 Pages.

Hagen, et al., "A proposed High-Dimensional Kolmogorov-Smirnov Distance", In Proceedings of Machine Learning and the

(56) References Cited

OTHER PUBLICATIONS

Physical Sciences: Workshop at the 34th Conference on Neural Information Processing Systems, Dec. 6, 2020, 6 Pages.

Hagen, et al., "Accelerated Computation of a High Dimensional Kolmogorov-Smirnov Distance", In repository of arxiv code:2106. 13706v1 [stat.CO], Jun. 25, 2021, 12 Pages.

Alexander, et al., "Pnnl/DDKS", Retrieved from: https://github.com/pnnl/DDKS, Apr. 4, 2022, 3 Pages.

Huang, et al., "Identifying Influencers in Social Networks", In Journal of Entropy (Basel), Apr. 15, 2020, 26 Pages.

Joshi, Prateek, "Using Graphs to Identify Social Media Influencers", Retrieved from: https://www.analyticsvidhya.com/blog/2020/03/using-graphs-to-identify-social-media-influencers/, Mar. 24, 2020, 10 Pages.

Kim, et al., "Multimodal Post Attentive Profiling for Influencer Marketing", In Proceedings of the Web Conference, Apr. 20, 2020, pp. 2878-2884.

Lada, et al., "How machine learning powers Facebook's News Feed ranking algorithm", Retrieved from: https://engineering.fb.com/2021/01/26/ml-applications/news-feed-ranking/, Jan. 26, 2021, 7 Pages.

Morgan Timothy Prickett, "The Looming Arm Server Battle Between Aws and Microsoft", Retrieved from: https://www.nextplatform.com/2022/04/05/the-looming-arm-server-battle-between-aws-and-microsoft/, Apr. 5, 2022, 13 Pages.

Nagre, Kartik, "kartikn27/nlp-question-detection", Retrieved from: https://github.com/kartikn27/nlp-question-detection, Oct. 10, 2019, 3 Pages.

Narassiguin, et al., "Data Science for Influencer Marketing : feature processing and quantitative analysis", In repository of arxiv code: 1906.05911v1 [cs.SI], May 10, 2019, 15 Pages.

Press, et al., "Kolmogorov-Smirnov Test for Two-Dimensional Data (scitation.org)", In Journal of Computers in Physics, vol. 2, Issue 4, Jul. 1988, 5 Pages.

Quach, Katyanna, "Behold the Megatron: Microsoft and Nvidia build massive language processor", Retrieved from: https://www.theregister.com/2021/10/12/nvidia_microsoft_mtnlg/, Oct. 12, 2021, 5 Pages.

Razova, et al., "Concentration Areas of Sentiment Lexica in the Word Embedding Space", In International Journal of Cognitive Informatics and Natural Intelligence, vol. 13, Issue 2, Apr. 2019, pp. 49-62.

Rizi, et al., "Properties of Vector Embeddings in Social Networks (mdpi.com)", In Journal of Algorithms, vol. 10, Issue 4, Sep. 27, 2017, pp. 1-15.

Saleh, et al., "Auto-generated Summaries in Google Docs", Retrieved from: https://ai.googleblog.com/2022/03/auto-generated-summaries-in-google-docs.html, Mar. 23, 2022, 5 Pages.

Schliski, Fabian, "Influence of Random Walk Parametrization on Graph Embeddings", In Proceedings of European Conference on Information Retrieval, Apr. 14, 2020, 8 Pages.

"How to Write an Executive Summary with Templates & Examples", Retrieved from: https://asana.com/resources/executive-summary-examples, Retrieved on: May 18, 2022, 27 Pages.

Simmons, Dan, "17 Countries with GDPR-like Data Privacy Laws", Retrieved from: https://insights.comforte.com/countries-with-gdpr-like-data-privacy-laws, Jan. 13, 2022, 1 Page.

Sinha, Ruchi, "Are You Being Influenced or Manipulated?", Retrieved from: https://hbr.org/2022/01/are-you-being-influenced-or-manipulated, Jan. 26, 2022, 9 Pages.

Sweet, et al., "Machine Learning Techniques for Brand-Influencer Matchmaking on the Instagram Social Network", In repository of arxiv code: 1901.05949v1 [cs.SI], Jan. 17, 2019, 10 Pages.

Taillon, Gabriel, "Gabinou/2DKS: 2 Dimensional Kolmogorov-Smirnov test for goodness-of-fit (github.com)", Retrieved from: https://github.com/Gabinou/2DKS, Jul. 16, 2021, 3 Pages.

Tiwary, Saurabh, "Microsoft Turing Universal Language Representation model, T-ULRv5, tops XTREME leaderboard and trains 100x faster—Microsoft Research", Retrieved from: https://www.microsoft.com/en-us/research/blog/microsoft-turing-universal-language-representation-model-t-ulrv5-tops-xtreme-leaderboard-and-trains-100x-faster/, Sep. 28, 2021, 10 Pages.

Tiwary, Saurabh, "Turing Bletchley: A Universal Image Language Representation model by Microsoft", Retrieved from: https://www.microsoft.com/en-us/research/blog/turing-bletchley-a-universal-image-language-representation-model-by-microsoft/, Nov. 1, 2021, 10 Pages.

Wang, Yingfan, et al., "PaCMAP: PaCMAP: Large-scale Dimension Reduction Technique Preserving Both Global and Local Structure (github.com)", Retrieved from: https://github.com/YingfanWang/PaCMAP, May 29, 2022, 8 Pages.

Zaiontz, Charles, "Two-Sample Kolmogorov-Smirnov Test", Retrieved from: https://www.real-statistics.com/non-parametric-tests/goodness-of-fit-tests/two-sample-kolmogorov-smirnov-test/, Retrieved on: May 18, 2022, 19 Pages.

Zhuang, et al., "Identification of Influencers in Online Social Networks: Measuring Influence Considering Multidimensional Factors Exploration", In Journal of Heliyon, vol. 7, Issue 4, Apr. 15, 2021, 13 Pages.

* cited by examiner

Figure 1:
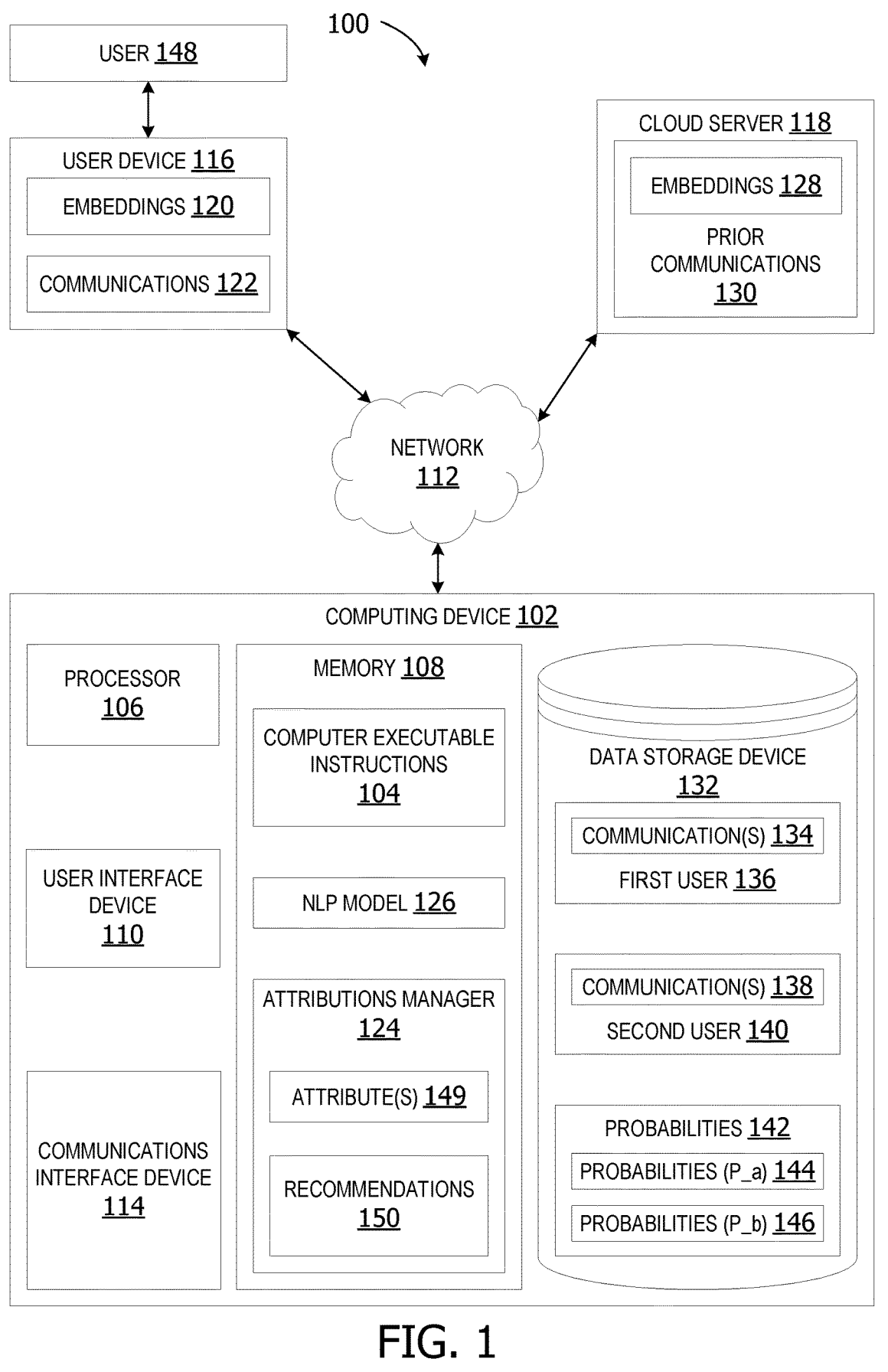

100

USER 148

USER DEVICE 116

EMBEDDINGS 120

COMMUNICATIONS 122

CLOUD SERVER 118

EMBEDDINGS 128

PRIOR
COMMUNICATIONS
130

NETWORK
112

COMPUTING DEVICE 102

PROCESSOR
106

MEMORY 108

COMPUTER EXECUTABLE
INSTRUCTIONS
104

NLP MODEL 126

ATTRIBUTIONS MANAGER
124

ATTRIBUTE(S) 149

RECOMMENDATIONS
150

USER INTERFACE
DEVICE
110

COMMUNICATIONS
INTERFACE DEVICE
114

DATA STORAGE DEVICE
132

COMMUNICATION(S) 134

FIRST USER 136

COMMUNICATION(S) 138

SECOND USER 140

PROBABILITIES 142

PROBABILITIES (P_a) 144

PROBABILITIES (P_b) 146

Figure 3:
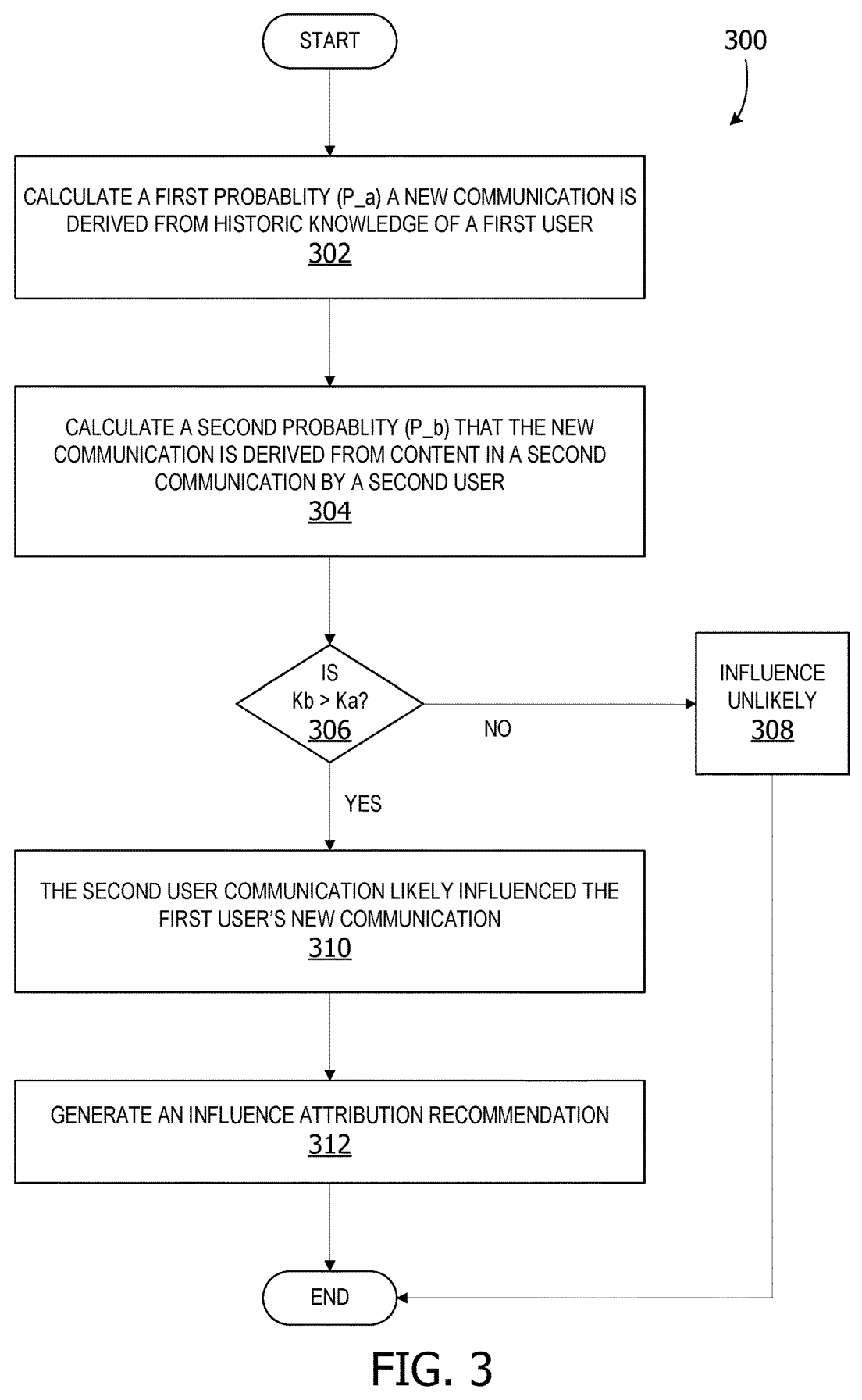

START

CALCULATE A FIRST PROBABLITY (P_a) A NEW COMMUNICATION IS
DERIVED FROM HISTORIC KNOWLEDGE OF A FIRST USER
302

CALCULATE A SECOND PROBABLITY (P_b) THAT THE NEW
COMMUNICATION IS DERIVED FROM CONTENT IN A SECOND
COMMUNICATION BY A SECOND USER
304

IS
Kb > Ka?
306

NO → INFLUENCE
UNLIKELY
308

YES

THE SECOND USER COMMUNICATION LIKELY INFLUENCED THE
FIRST USER'S NEW COMMUNICATION
310

GENERATE AN INFLUENCE ATTRIBUTION RECOMMENDATION
312

END

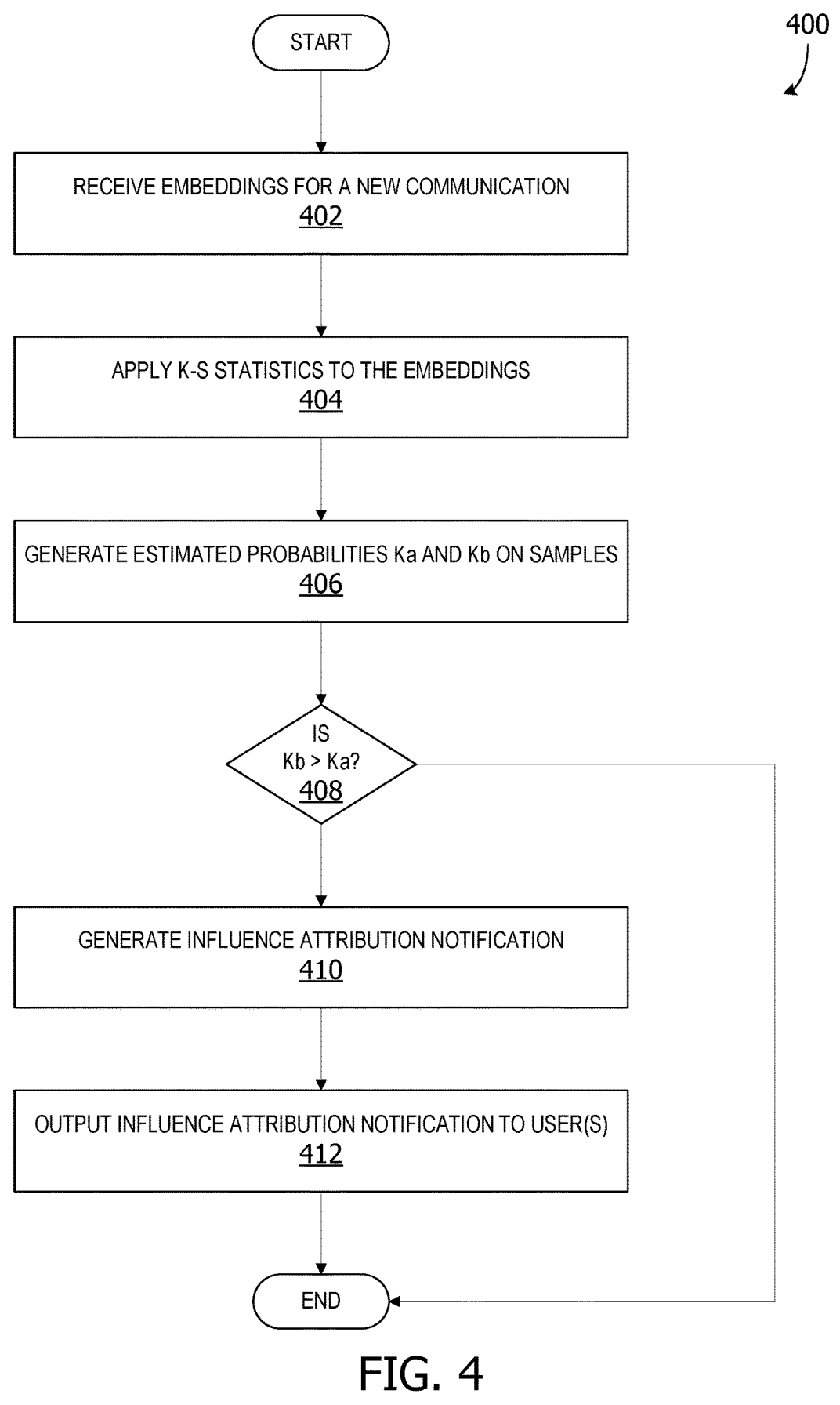

START

RECEIVE EMBEDDINGS FOR A NEW COMMUNICATION
402

APPLY K-S STATISTICS TO THE EMBEDDINGS
404

GENERATE ESTIMATED PROBABILITIES Ka AND Kb ON SAMPLES
406

IS
Kb > Ka?
408

GENERATE INFLUENCE ATTRIBUTION NOTIFICATION
410

OUTPUT INFLUENCE ATTRIBUTION NOTIFICATION TO USER(S)
412

END

FIG. 4

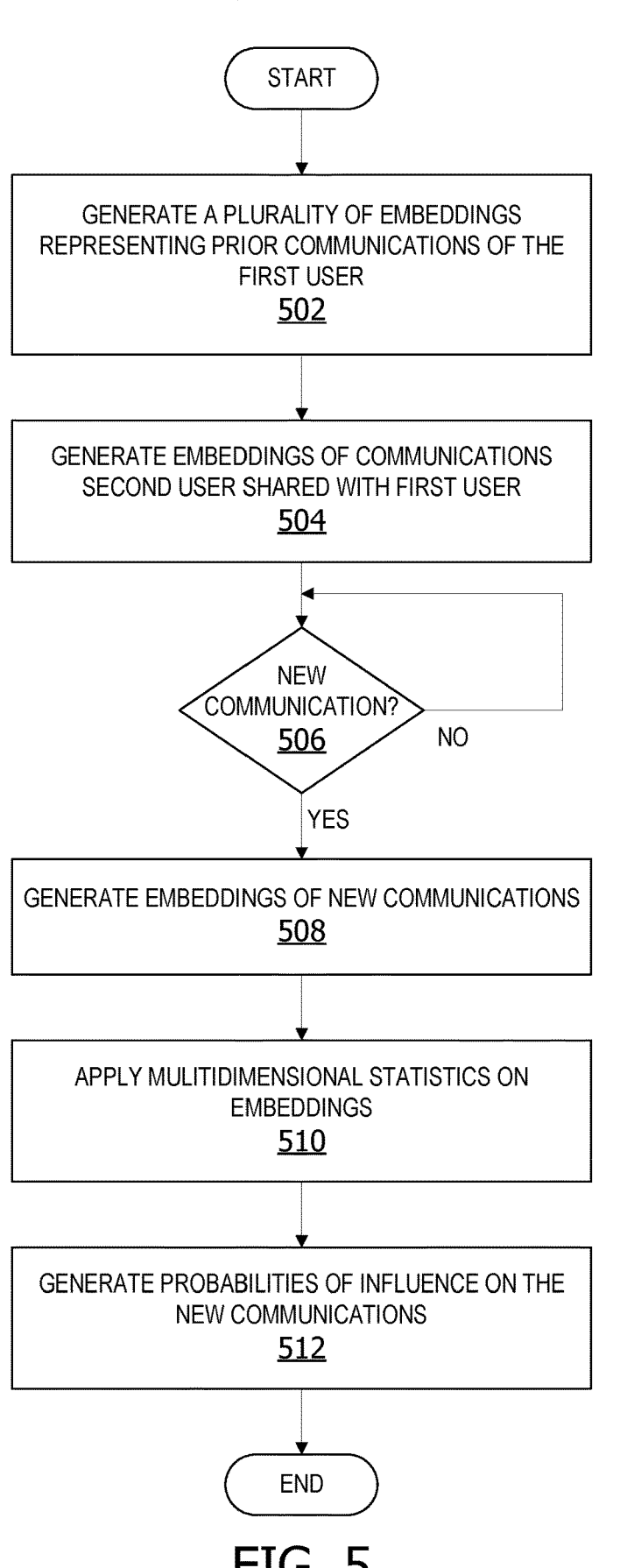

500

START

GENERATE A PLURALITY OF EMBEDDINGS
REPRESENTING PRIOR COMMUNICATIONS OF THE
FIRST USER
502

GENERATE EMBEDDINGS OF COMMUNICATIONS
SECOND USER SHARED WITH FIRST USER
504

NEW
COMMUNICATION?
506

NO

YES

GENERATE EMBEDDINGS OF NEW COMMUNICATIONS
508

APPLY MULITIDIMENSIONAL STATISTICS ON
EMBEDDINGS
510

GENERATE PROBABILITIES OF INFLUENCE ON THE
NEW COMMUNICATIONS
512

END

PERSON A

MEETING

604

PERSON B

606

PERSON C

EMAIL

700

1102

| T-6 | T-5 | T-4 | T-3 | T-2 | T-1 | T-0 |
|-----|-----|-----|-----|-----|-----|-----|
| NEED A DOC | SENT AN EMAIL | READ MESSAGE | READ PRESENTATION | SENT CHAT MESSAGE | READ CHAT MESSAGE | WRITE EMAIL |

User A influenced your team.

User A's idea of measuring influence of other have influenced your team.

Figure 15:
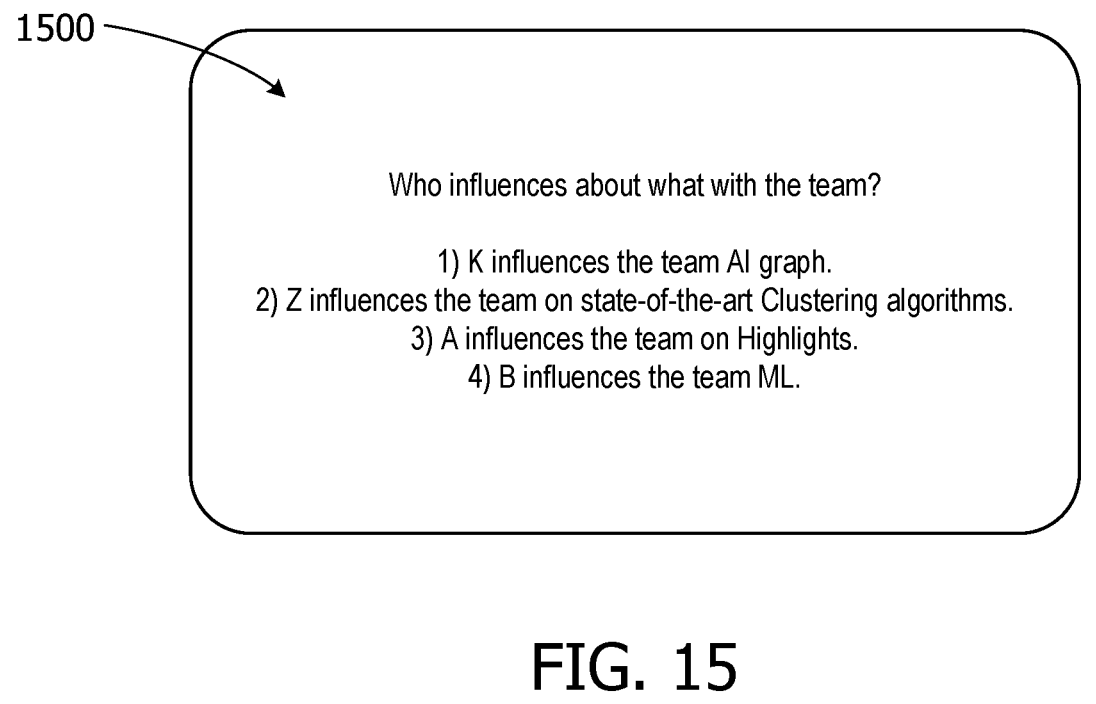

1500

Who influences about what with the team?

1) K influences the team AI graph.
2) Z influences the team on state-of-the-art Clustering algorithms.
3) A influences the team on Highlights.
4) B influences the team ML.

Figure 16:
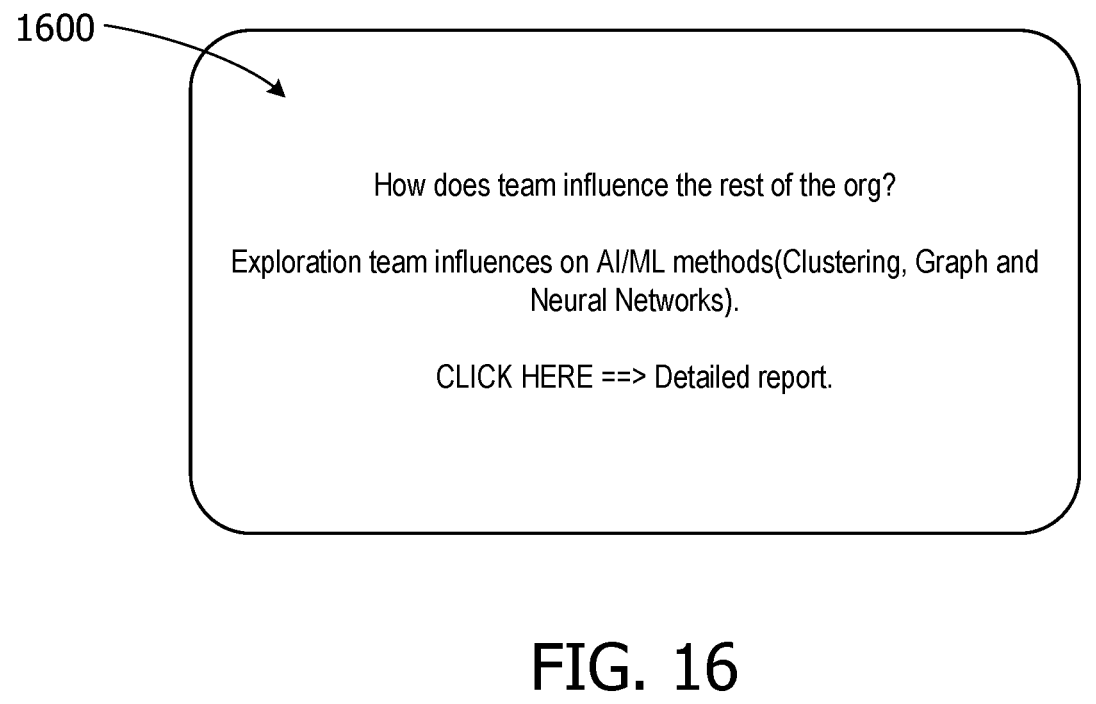

How does team influence the rest of the org?

Exploration team influences on AI/ML methods(Clustering, Graph and
Neural Networks).

CLICK HERE ==> Detailed report.

Personal Recommendation – get 2nd opinion input

You have been influenced by peers in exploration team.

Your doc about Efficient Product Marketing rocks!

This document announcement email has been forwarded or lead to derived emails throughout the org and spawned several new documents citing your doc, in addition to a large amount of comments/suggestion.

Influencers Last 30 days – Click on selected pie to get details on how they influenced you

MEASURING PROBABILITY OF INFLUENCE USING MULTI-DIMENSIONAL STATISTICS ON DEEP LEARNING EMBEDDINGS

BACKGROUND

Influencers are individuals that can inspire the work and creativity of others, even if they do not work directly with those they influence. Influencers can greatly improve others work product and quality. However, influencers frequently go unrecognized due to the difficulty of identifying them, those they influence and what they influence. This lack of insight into potential influencers and the impact of their influence can result in suboptimal utilization of resources, lack of recognition for influencers and reduce efficiency of teams.

SUMMARY

Some examples provide a system for measuring probability of influence in communications. The system includes a processor and a memory comprising computer-readable instructions. The memory and the computer-readable instructions are configured to cause the processor to calculate a first probability and a second probability. The first probability is a probability that a portion of content from a first communication spoken or written by a first user is derived from historic knowledge of the first user. The historic knowledge of the first user includes semantic embeddings representing prior communications associated with the first user. The second probability is a probability that the portion of the content associated with the first communication generated by the first user is derived in part from content of a second communication generated by a second user prior to generation of the first communication by the first user. The first user interacted with the second communication prior to generation of the first communication. An influence attribution recommendation including an influence attribution acknowledging the influence of the second user on the first communication is generated in response to a determination that the second estimated probability exceeding the first estimated probability.

Other examples provide a method for measuring probability of influence in communications. Semantic embeddings representing a new communication generated by a first user at a first time period are obtained. A first estimated probability that a portion of content associated with the new communication is derived from historic knowledge of the first user is calculated using multidimensional statistics on the semantic embeddings of the new communication and the semantic embeddings representing prior communications of the first user associated with the historic knowledge of the first user. Semantic embeddings representing a second communication generated by a second user at a second time period are received. The second time period occurring prior to the first time period. The second communication accessible to the first user prior to generation of the new communication by the first user. A second estimated probability the content of the new communication generated by the first user is influenced by the second communication generated by the second user is calculated. A determination is made whether the second estimated probability is greater than the first estimated probability. An influence attribution recommendation is generated. The influence attribution includes an influence attribution of the second user, responsive to a determination the second estimated probability exceeding the first estimated probability.

Still other examples provide one or more computer storage devices having computer-executable instructions stored thereon for measuring probability of influence in communications. Semantic embeddings are generated. The semantic embeddings represent a new communication generated by a first user at a first time period. A first estimated probability a portion of content associated with the new communication is derived from historic knowledge of the first user is calculated using multidimensional statistics on the semantic embeddings of the new communication and the semantic embeddings representing prior communications of the first user associated with the historic knowledge of the first user. Semantic embeddings are generated representing a second communication generated by a second user at a second time period. The second communication was accessible to the first user prior to generation of the new communication by the first user. A second estimated probability the content of the new communication generated by the first user is influenced by the second communication generated by the second user is generated using the multidimensional statistics on the semantic embeddings representing the new communication and the semantic embeddings representing the second communication. An influence attribution recommendation is generated. The recommendation includes an influence attribution of the second user in response to a determination the second estimated probability exceeding the first estimated probability.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is an exemplary block diagram illustrating a system for measuring a probability of influence on digital communications.

FIG. 3 is an exemplary flow chart illustrating operation of the computing device to generate an influence attribution recommendation.

FIG. 4 is an exemplary flow chart illustrating operation of the computing device to generate probabilities of influence on communications.

FIG. 5 is an exemplary flow chart illustrating operation of the computing device to generate probabilities of influence associated with a new communication.

FIG. 11 is an exemplary table illustrating measuring influence by content similarity.

FIG. 15 is an exemplary block diagram illustrating a UI displaying information describing who influences what within a team.

FIG. 16 is an exemplary block diagram illustrating a UI displaying information describing how a team influences the rest of an organization.

FIG. 17 is an exemplary block diagram illustrating a UI displaying information describing a recommendation.

FIG. 20 is exemplary block diagram illustrating an example computing environment suitable for implementing some of the various examples disclosed herein.

Corresponding reference characters indicate corresponding parts throughout the drawings.

DETAILED DESCRIPTION

Figure 2:
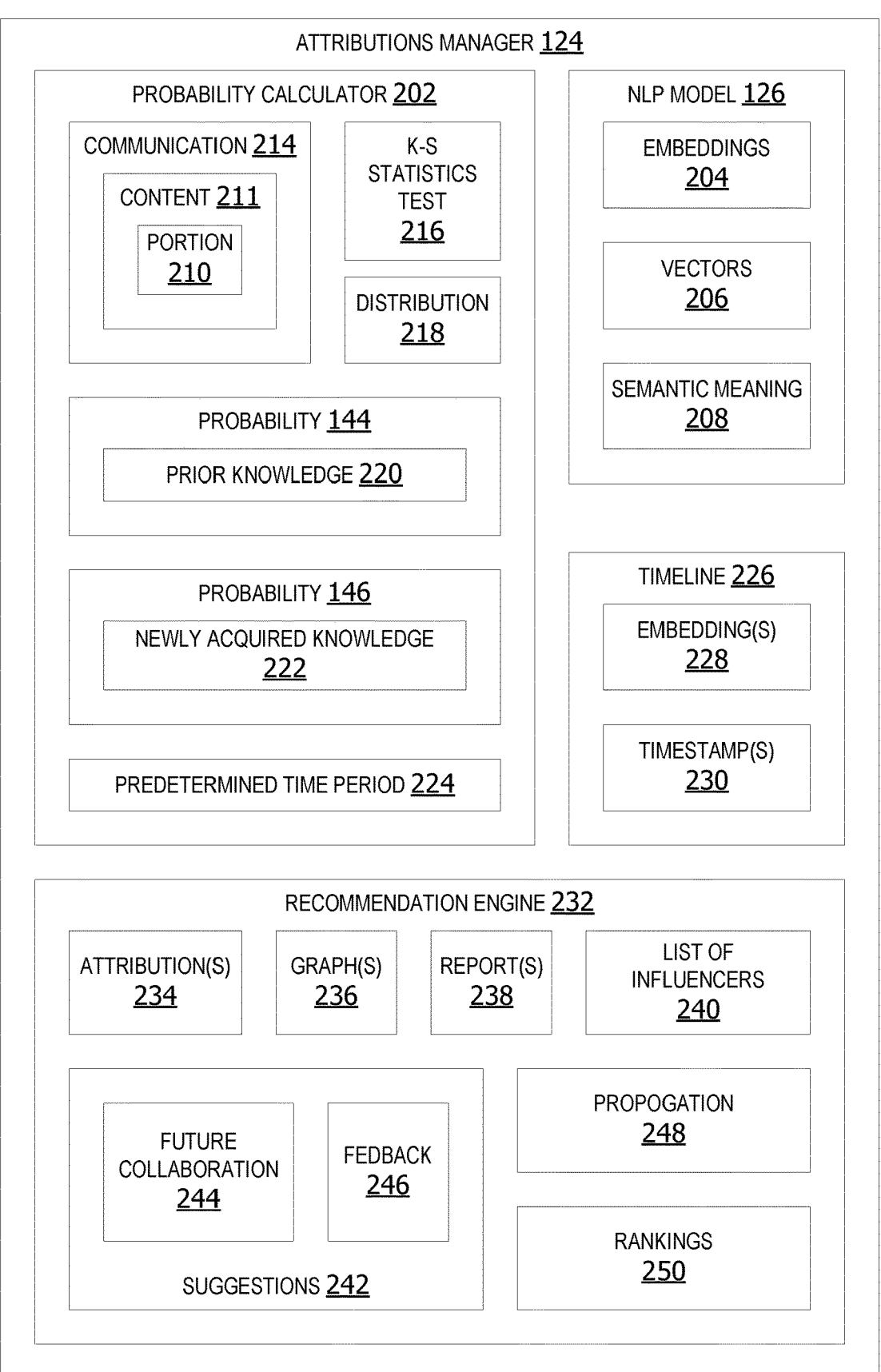
FIG. 2 is an exemplary block diagram illustrating an attributions manager for measuring probability of influence on communications.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseam.

Ideas, projects, goals, and decisions are shaped by communication, in the form of mutual influence, between members of groups, such as companies and organizations. The many benefits of collaboration and communication between people can include increased revenue, creativity, quality, and greater efficiency. These are only some of the reasons companies, groups, and organizations with more than one member exist. However, it can be difficult or impossible to perform in-depth measuring of how this influence works through communication.

Measuring influence through digital communication requires computational, semantic understanding of the communication. Digital communication includes text and other elements of communication, such as metadata, images, and other multimedia. The semantic understanding of text can be performed using sentence embeddings, which allows for comparing sentences that use completely different words but convey similar meaning.

Referring to the figures, examples of the disclosure enable measuring probability of influence in digital communications using multidimensional statistics on deep learning embeddings. In some examples, an attributes manager calculates a probability that a new communication by a selected user is from the user's own historical knowledge. This is accomplished by applying multidimensional statistics on embeddings representing the new communication and the historical knowledge or a sample of the historical knowledge embeddings. This probability can be a percentage value or ranking indicating a likelihood the contents or portion of the contents of the new communication came from the user's own prior knowledge. For example, if the probability a communication is from the same distribution as prior knowledge is 45% and the probability the communication is from recently acquired information, then it is most likely the communication was not based on the user's own historical knowledge. Influence most likely did occur in this example.

In other examples, the attributes manager calculates a probability that the new communication by the selected user was influenced by recently acquired information obtained from communication(s) made by another user. If the probability the communication was influenced by another user is greater than the probability the communication came from the selected user's own historical knowledge, the new communication was likely influenced by the recently obtained information from the other user. The system generates an influence attribute acknowledgement and recommends actions to be taken, such as providing feedback to the influencer.

Aspects of the disclosure enable an attributions manager that calculates a first probability that content associated with a first communication generated by a first user is derived from historic knowledge of the first user. The probability is generated using semantic embeddings of prior communications associated with the historic knowledge of the first user. This enables calculation of a percentage value which can quickly be used to determine whether the new communication likely originated in the user's own previous knowledge based on previously generated semantic embeddings. This reduces processor usage and network usage consumed during determination of the influence attributions.

Other aspects of the disclosure further enable generation of influence attribution notifications and recommendations by the attributions manager which are output to the user(s) via a user interface (UI). In this manner, the UI provides the user with insights into who has influenced the user, who has been influenced by the user and other potential insights into the impact of any influence which has been identified. The user can simply select, click on, or otherwise review the notifications and insights provided via the UI. This improves user interaction and efficiency via the UI.

Still other examples generate an influence attribution recommendation, including an influence attribution of the second user where the second estimated probability is greater than first estimated probability, indicating influence likely occurred. The recommendation provides results of the influence attribution determination, as well suggestions regarding actions to be taken by the user for more accurate and consistent response to influence attribution determinations. In other words, where influence has occurred, the recommendation provides suggestions for additional actions which can be taken to optimize or otherwise encourage positive influential interactions between users, such as, but not limited to, recommending the user send a message to the influencer acknowledge the contributions of the influential person, recommend future collaboration with influencers, etc. The suggestions provided in the recommendations encourage future desirable influential and collaborative communications between people and groups.

In some respects, the system provides influencer attribution and recommendations in the form of graphs, charts, tables, reports and other summaries of influences and influencers associated with users. The influencer attribution and recommendations data further enable quick and concise identification of persons and communications that influence a given user, as well as identification of those that are influenced by the given user. The recommendations can further include identification of which portions of a communication were most influential, enabling users to improve communication skills as well as plan for improved future collaboration among users.

Other examples provide influence attributions and recommendations which enable users to identify others that might be beneficial to communicate with on social media, influential authors to read, coworkers for collaboration, etc. The recommendations further improve user interactions with each other as well as improve overall communication efficiency by identifying influential communications for propagation and inefficient communications or collaborations which are less successful or uninfluential. Eliminating inefficient communications and collaborations enables reduced usage of system resources, such as network resources and processor resources utilized in unproductive video conferences, meetings, emails, messages, etc.

The attributes manager executing on a computing device utilizes embeddings and multidimensional statistics to identify influencers on communications. The computing device operates in an unconventional manner by providing recommendations for suggested actions based on identified influences and influencers. In this manner, the computing device operates in an unconventional manner by providing recommendations for improving quality of work and communications efficiency optimized based on influence attributions and recommended actions, thereby improving the functioning of the underlying computing device by reducing processor and network resource usage which would otherwise be consumed in inefficient communications between persons uninformed of the influence insights and recommendations.

Referring again to FIG. 1, an exemplary block diagram illustrates a system 100 for measuring a probability of influence on digital communications. In the example of FIG. 1, the computing device 102 represents any device executing computer-executable instructions 104 (e.g., as application programs, operating system functionality, or both) to implement the operations and functionality associated with the computing device 102. The computing device 102 in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102 in other examples includes a user interface device 110.

The processor 106 includes any quantity of processing units and is programmed to execute the computer-executable instructions 104. The computer-executable instructions 104 is performed by the processor 106, performed by multiple processors within the computing device 102 or performed by a processor external to the computing device 102. In some examples, the processor 106 is programmed to execute instructions such as those illustrated in the figures (e.g., FIG. 3, FIG. 4, and FIG. 5).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to a user device 116 and/or a cloud server 118, can occur using any protocol or mechanism over any wired or wireless connection. In some examples, the communications interface device 114 is operable with short range communication technologies such as by using near-field communication (NFC) tags.

The user device 116 represent any device executing computer-executable instructions. The user device 116 can be implemented as a mobile computing device, such as, but not limited to, a wearable computing device, a mobile telephone, laptop, tablet, computing pad, netbook, gaming device, and/or any other portable device. The user device 116 includes at least one processor and a memory. The user device 116 can also include a user interface device for presenting data (output) to the user or receiving input from the data. In this example, the user device 116 is a mobile device, such as a smartphone or tablet. In other examples, the user device 116 can include an augmented reality (AR)

headset, a virtual reality (VR) headset, smart glasses, smart watch, or any other type of computing device.

In some examples, the user device generates embeddings 120 of communications 122 for use by an attributions manager 124 in generating probabilities of influence on communications. A communication in the communications 122 is any type of communication, such as a written/text communication, a verbal communication, a video image, or any other type of communication. The communications can include text data, audio data, image data, etc. In some examples, the communications include one or more sentences in a text message, chat message, document, journal article, email message, letter, social media post, presentation documentation, transcript of speech spoken at a meeting or phone conference, or any other type of communication. The embeddings also include semantic representations of images, such as graphical images, icon, emojis, video images, graphs, or any other type of visual communication.

An embedding in the embeddings 120 includes numerical representations (values) of communications as a vector in vector space. The vector space quantifies semantic similarities between categories. Semantic meanings and semantic similarities can be identified by comparing embedding vectors. Embedding vectors that are close to each other in a distribution are close to each other in semantic meaning.

Embeddings 120 are generated by a natural language processing (NLP) model, such as, but not limited to, a transformer model. The NLP model generating the embeddings, in some examples, is located on the user device 116 for generating the embeddings on the user device. In other examples, the NLP model is located on the cloud service for generating the embeddings, in whole or in part, on the cloud service. The embeddings generated on the cloud service can then be transmitted to the user device 116, stored on the cloud service or other cloud storage, and/or transmitted to the computing device 102.

In some examples, the embeddings are generated by Bidirectional Encoder Representations (BERT) models based on machine learning (ML) for national language processing. In other examples, the embeddings are generated by a Turing language model. In still other examples, the embeddings are generated by a Megatron-Turing natural language generation (MT-NLG) model.

In this example, the embeddings are generated by the user device 116. The embeddings are transmitted to the attributions manager 124 on the computing device 102 via the network 112. In other examples, the embeddings are transmitted to a storage device, such as the data storage device or a cloud storage. In still other examples, the embeddings are transmitted to the cloud server for utilization by an attributions manager on the cloud service. The embeddings are optionally encrypted or otherwise transmitted to the computing device 102, the cloud server, and/or a data store using one or more data encryptions and/or other security protocols. However, the examples are not limited to generating embeddings on the user device and transmitting the embeddings to the computing device 102. In other examples, the embeddings are analyzed by an attributions manager application on the user device. In still other examples, the embeddings are analyzed by an attributions manager on a cloud service, such as, but not limited to, the cloud server 118.

In other examples, the embeddings are generated, in whole or in part, by the cloud server 118. In other words, all the embeddings can be generated on the cloud server 118 or some of the embeddings can be generated on the cloud server while other embeddings are generated on the user device 116, the computing device 102 or other computing device.

The embeddings are transmitted from the cloud server 118 to the attributions manager 124 on the computing device 102 via the network 112. In other examples, the embeddings are transmitted from the cloud server 118 to a storage device, such as the data storage device or a cloud storage. In still other examples, the embeddings are transmitted from the cloud server 118 to the attributions manager on computing device 102. The embeddings are optionally encrypted prior to being transmitted to the computing device 102 using one or more data encryptions and/or other security protocols.

In still other examples, the embeddings are optionally generated by an NLP model 126 on the computing device 102. In this example, the computing device 102 is associated with another user participating in one or more communications with one or more other users. The user associated with the computing device 102 provides opt-in consent for select communications to be converted into embeddings and utilized for influence attributions analysis. In these example, the communications are generated via user interactions with the user interface, such as video conferencing, messaging, email, data feeds, etc.

In other examples, the computing device 102 receives communications data from the user device for conversion into embeddings. In this example, the user associated with the user device 116 provides opt-in consent for communications to be transmitted to the computing device. In these examples, encryption or other data security protocols are utilized to protect privacy of user data.

The NLP model 126 is any type of model for generating embeddings of natural language sentences or other communications, such as, but not limited to, a BERT model, a Turing model, a MT-NLG model, or any other type of model pretrained to generated embeddings representing semantic meanings of communications or portions of a communications.

The cloud server 118 is a logical server providing services to the computing device 102 or other clients, such as, but not limited to, the user device 116. The cloud server 118 is hosted and/or delivered via the network 112. In some non-limiting examples, the cloud server 118 is associated with one or more physical servers in one or more data centers. In other examples, the cloud server 118 is associated with a distributed network of servers.

In some examples, the NLP model implemented on the cloud server 118, user device 116 and/or the computing device 102 generates embeddings representing communications by one or more users. In this example, the NLP model generates embeddings 128 representing prior communications 130 by a user. The prior communications 130 are communications made by a given user. Content of the prior communications 130 represent historical knowledge of the given user. For example, a prior communication of a given user discussing machine learning (ML) can be used by the attributions manager to establish some prior knowledge of ML by the given user.

The system 100 can optionally include a data storage device 132 for storing data, such as, but not limited to communication(s) 134 generated by a first user 136, communication(s) 138 generated by a second user 140, as well as probabilities 142 generated by the attributions manager 124. The communication(s) of the first user and/or the second user 140 in this example include prior communications associated with the historical knowledge of the user(s). In other examples, the data storage device 132 can also store embeddings generated by a remote computing device, such as, but not limited to, the embeddings 120 generated by the user device 116 and/or the embeddings 128 generated by the cloud server 118.

The data storage device 132 can include one or more different types of data storage devices, such as, for example, one or more rotating disks drives, one or more solid state drives (SSDs), and/or any other type of data storage device. The data storage device lxx in some non-limiting examples includes a redundant array of independent disks (RAID) array. In other examples, the data storage device 132 includes a database.

The data storage device 132 in this example is included within the computing device 102, attached to the computing device, plugged into the computing device, or otherwise associated with the computing device 102. In other examples, the data storage device 132 includes a remote data storage accessed by the computing device via the network 112, such as a remote data storage device, a data storage in a remote data center, or a cloud storage.

In this example, both communications and embeddings are stored. However, in other examples, only the embeddings are stored. This improves communications security and privacy for users, as well as reducing data storage resource usage.

The probabilities 142 include one or more estimated probabilities generated by the attributions manager using multidimensional statistics on the embeddings, such as, but not limited to, a first probability (P_a) 144 that a new communication by a selected user 148 is derived from the selected user's own historical knowledge rather than derived from recently acquired information the selected user was exposed, such as by a communication from another user. The first probability 144 can include an estimated probability. The probability 144 is referred to as an estimated probability because all prior communications and/or all historical knowledge of the selected user 148 is unavailable to the attributions manager 124. In such circumstances, the probability 144 and the probability 146 are estimated probabilities.

The second probability (P_b) 146 is a probability that the new communication by the selected user 148 is influenced or otherwise derived from information contained in a second communication that the selected user was exposed to or otherwise had access. The second communication is generated by one or more other users before the selected user 148 generated the new communication. The second communication includes a communication generated by a single person, as well as a communication generated by two or more persons, such as a paper having multiple authors. In some examples, an influencer in a multi-authored communication can be determined based on the prior knowledge of each contributor. In other examples, where more than one influencer influenced a communication, each influencer is identified based on the prior knowledge of each influencer and the contents of the communication. Where more than one influencer is identified, the system optionally designates a primary influencer that is attributed to a majority of the influence over the communication.

The term "generated by," when referring to a communication made by a user, refers to speaking, writing, drawing, gesturing, or otherwise conveying information to another. For example, a user can generate a communication by using natural language speech, writing a message, posting a picture on social media, responding to an email, clicking on a link in an email to access a linked document or website, authoring a document, forwarding a document to another user, etc.

In some examples, the probability 146 is generated using multidimensional statistics on communications generated by the second user that the selected user 148 was exposed to either directly or indirectly. A direct communication is a communication which is directed to the selected user, such as an email sent to the selected user. An indirect communication is a communication which the selected user had access to or otherwise was exposed to indirectly, such as if an email is forwarded to the selected user 148 by a recipient of the email.

A determination is made by the attributions manager 124 as to whether it is likely a communication from the second user, or any other user, influenced the new communication by the selected user 148. This determination is made by comparing the first and second probabilities. If the second probability 146 is greater than the first probability 144, it is probable that the new communication was influenced by a communication from someone else, such as the second user.

The attributions manager 124 is a software component for identifying attribution(s) 149 and generating recommendation(s) 150 associated with the identified attributions 149. The recommendation(s) 150 can include recommendations for a user to acknowledge the influence/attribution of the second user generating the second communication which influenced the later new communication by the user 148. The recommendation(s) 150 can optionally also include suggested actions to be taken by the user 148, a manager, supervisor, team leader, project manager, or other user associated with either the selected user 148 or the influencer (second user).

Influencers can be defined as people with great outreach or following. Influencers are those that can "influence" other people's way of thinking, create an emotional reaction, motivate, teach, and guide in almost any topic. In general terms, the influence can be either positive or negative. The influence attributions may enable users to identify influencers who align with goals of a company, project, or other enterprise culture and direction. Taking into account various dimensions of influence, influencers may include persons who create content, such as email, documents, sites, and videos that many people interact with by reading, liking, forwarding, or replying to the content. Influencers may also include a person who creates content which other "influencers" interact with, a person that many different people interact with and/or a person who has influenced others professionally. Topic influencers are pivoted around a specific topic. Cultural influencers are people that promote positive change in the workplace or other environment. Role model influencers are people in a role others want to pursue. In other words, the role model influencer is about influential communications associated with persons in a particular position, role, or title rather than behavior.

The attributions manager 124 optionally includes a machine learning component using pattern recognition, modeling, or other machine learning algorithms to identify appropriate recommendations customized for each user based on the identified attribution(s) 149, action(s) of the user(s), current projects, collaborations, team memberships, etc. Feedback from the users regarding the recommendations 150 are used by the attributions manager 124 with training data to fine-tune output recommendations.

In some examples, the attributions manager 124 obtains semantic embeddings representing a new communication generated by a first user at a first time period, semantic embeddings associated with historic knowledge of the first user, and semantic embeddings representing a second communication generated by a second user at a second time period. The second time period is a time prior to the first time period. The second communication is a communication that was accessible to the first user prior to generation of the new communication by the first user. In other words, the first user was exposed to the content of the second communication within a predetermined time-period before making the new communication. The user can be exposed to a communication by being included in an included as an attendee of a meeting, being included on an email recipient list, being part of a transcribed discussion, etc. Thus, the second communication can include, for example, a communication which the user read, heard, or otherwise was exposed to during a given time period and within certain contexts, such as business-related meetings, project-related emails, etc.

For example, if a person "A" exposes the user "B" to something new, such as fact "X" in a first communication and then user "B" proceeds to act on fact "X", as evidenced by a second communication to user C which references fact "X" in some manner within the predetermined time period, then person "A" might have inspired or influenced person "B." A determination is made whether the communication was within the predetermined time period by referencing a timestamp or other time and date indicator associated with a record of each communication or embedding representing each communication.

In some examples, the system narrows down all the many possible prior communications which can be considered to identify one the first communication which may have influenced the second communication using a user-configurable predetermined time window during which prior communications are considered. For example, if the predetermined time-period is thirty days, the system only considers communications to which the user is exposed during the influence determination. In other examples, if the predetermined time-period is fourteen days, the system only considers potentially influential communications to which the user was exposed during the fourteen-day time period prior to the instant communication which is being analyzed for possible influence attribution. In other examples, the predetermined time period is a default or pre-defined time-period.

In other examples, the system narrows down all the many possible prior communications which can be considered for influence attribution based on topic, category, or keyword filtering. For example, the system can be configured to only considered communications related to certain projects, subjects, persons, products, or any other suitable subject-matter filtering.

In still other examples, the system narrows down all the many possible prior communications which can be considered for influence attribution based on user opt-in or privacy agreements. For example, the system may only consider communications associated with certain persons, subjects, projects, teams, or sources for which prior consent or opt-in by one or more users has been obtained. Thus, if user "A" opts-in to receive influence attribution recommendations but user "B" does not, the system excludes any communications associated with user "B" from consideration.

In yet other examples, the system narrows down all the many possible prior communications which can be considered for influence attribution based on source of the communication. In one example, the system utilizes communications associated with transcripts of video conferencing meetings, published articles, and chat messages generated during the meetings but excludes social media posts. In this example, any communications from social media sources are excluded based on the source of the communication.

The semantic embeddings obtained by the attributions manager 124 can be obtained from the user device 116, obtained from the cloud server 118, obtained from the data storage device 132, obtained directly from the NLP model 126, or obtained from any other source of deep learning embeddings.

The attributions manager calculates a first estimated probability that a portion of content associated with the new communication is derived from historic knowledge of the first user based on analysis of the semantic embeddings of the new communication and the semantic embeddings representing prior communications of the first user associated with the historic knowledge of the first user. The attributions manager 124 calculates a second estimated probability the content of the new communication generated by the first user is influenced by the second communication generated by the second user.

The attributions manager 124 in other examples determines if the second estimated probability is greater than the first estimated probability. The attributions manager 124 generates an influence attribution recommendation if a determination the second estimated probability exceeding the first estimated probability. The recommendation in some examples includes a suggestion that someone acknowledge the contribution of the second user to the content of the new communication and/or any other future actions or progress which may be made relative to the content influenced by the second user.

FIG. 2 is an exemplary block diagram illustrating an attributions manager 124 for measuring probability of influence on communications. In some examples, the attributions manager 124 includes a probability calculator 202 component. The probability calculator 202 applies multidimensional statistics on embeddings 204 generated by an NLP model 126. The embeddings 204 include vectors 206 representing the semantic meaning 208 of sentences, images, or other portion 210 of content 211 associated with a communication 214 generated by a user. In some examples, the multidimensional statistics used include, for example, Kolmogorov-Smirnov (K-S) statistics test 216 used to calculate the likelihood that two samples are from the same distribution 218. However, in other examples, Maximum Mean Discrepancy (MMD) can also be used instead of K-S statistics test.

The probability calculator 202 calculates a probability 144 that a new communication 214 is derived from the user's prior knowledge 220. The probability calculator 202 also calculates a probability 146 that the new communication 214 is derived from or otherwise influenced by newly acquired knowledge 222 obtained from a communication from another person. The newly acquired knowledge 222 is information associated with content from a communication the user was exposed to within a predetermined time period 224 prior to generation of the new communication 214 by the selected user.

The predetermined time period 224 is any user-defined time-period. In some examples, the predetermined time period 224 is three months. In another example, the predetermined time period 224 is six weeks. In still another example, the predetermined time period 224 is ten days or any other user-configurable time-period.

In some examples, the attributions manager 124 generates a timeline 226 of semantic embeddings 228 representing each user. The timeline 226 includes timestamp(s) 230 or other time/date data indicating when each communication data represented by an embedding in the timeline occurred. The timeline(s) are used to identify earlier communications a given user was exposed to which may have influenced later communications made by the given user. The user timelines of semantic embeddings can optionally be utilized in an enterprise setting where the system has access to user communications and/or embeddings representing those communications within the enterprise.

In other examples, the attributes manager 124 estimates probability of influence on a communication by representing users as timelines of semantic representation of digital communication. For example, when a user reads text, the text is converted to semantic embeddings of sentences, paragraphs, documents. When a user views images, the images are converted to semantic representations of the images, image segments and sketches. The image segments are objects extracted from an image. For example, an image of a cat walking on a table can be converted to the same semantic embeddings as would be used for the text sentence "A cat walking on a table."

Viewed tables can be converted to semantic representation of the tables. Other multimedia is converted to audio and video embeddings. The sources of digital communications used to create the semantic representation include, for example, direct communications through chats and emails. Digital meetings, such as video conferences, can include audio, image/video and related information, which can be converted to semantic representations. The transcribed text generated from digital meeting audio, as well as the documents presented by participants in the meetings, chat messages generated by participants in the meetings, and links to documents and web pages provided by participants in the meeting chat are also converted to semantic embeddings. Communications converted to embeddings also includes data obtained through glasses or contact lens hardware supporting augmented reality (AR) and/or virtual reality (VR), as well as publicly available data on social media platforms.

For each new communication produced or uttered by a person, for example, by speaking in a meeting, writing an email, or writing a document, the attributions manager estimates the probability that this information is from their prior knowledge or by knowledge the user has recently obtained—both represented as timelines of semantic embeddings. This probability can be estimated with Kolmogorov-Smirnov statistics which can calculate the likelihood if two samples are from the same distribution, for example. High dimensional Kolmogorov-Smirnov statistics are suitable for handling semantic embedding vectors.

The probability of new communication from same distribution as the person's historic knowledge, excluding the new communication, is calculated as a first probability (P_a) using multidimensional statistics on a sample of the new communication embeddings by the first user and the past communication embeddings or samples of the past communication embeddings of the first person. In some examples, the multidimensional statistics used include Kolmogorov-Smirnov statistics test.

The probability that a new communication is from the same distribution as newly obtained information associated with influence from another person is calculated as a second probability (P_b), The second probability (P_b) is calculated using multidimensional statistics, such as the Kolmogorov-Smirnov statistics test, on the new communication embeddings generated by the first user and the recent communication exposure embeddings for communications generated by the second user or sample(s) of the recent communications generated by the second user. If the second probability (P_b) is greater than the first probability (P_a) then it is more likely that there was influence than that the new communication content came only from the first user's historic knowledge.

The limitations include limits on external knowledge by a person, which is difficult to capture. However, that issue is the same for P_a and P_b. This is estimating the probability of influence, not the actual influence itself.

The attributions manager 124 optionally includes a recommendation engine 232. The recommendation engine 232 generates a recommendation output to one or more users in response to the probability calculator 202 identifying an earlier communication of a second user which probably influenced a new communication by the first user. The recommendation optionally includes an identification of the attribution(s) 234 associated with a given communication. The attribution identifies each user that likely influenced the user. The attribution(s) 234 can include one or more influencers (users).

The recommendation in other examples includes graph(s) 236 and/or reports 238 describing the influencers that influenced the communications or actions of others as well as describing the influences that each user had on others. The recommendation can include a list of influencers 240 for each user. The list of influencers includes a list of names of each user that influenced actions or communications by a given user.

In other examples, the recommendation includes suggestions 242 for future actions, such as, but not limited to, suggestions for future collaboration 244 with influential people and/or feedback 246 regarding the influences or impact each user had on others. The recommendation can optionally also include data identifying paths of idea propagation 248. Paths of idea propagation 248 describe or identify a chain of people or events which are influenced by a given person.

In still other examples, the recommendation includes a percentage of influence or influence rankings 250. The rankings 250 can be used to indicate who had the most influence on a given person, as well as indicating which people or events a given person had the most influence. The recommendations can be presented within a user feed, an email message, a social media posting, a report or graph sent to the user via an email or link, or any other form.

The recommendations are optionally output to a user via a user interface, such as, but not limited to the user interface 110 in FIG. 1. The recommendation can be output to the user via a mobile device associated with a recipient of the recommendation, such as the user device 116 in FIG. 1. For example, the recommendation can be sent to the user via a smartphone, an augmented reality headset, a virtual reality headset, a tablet, smartwatch, or any other computing device.

FIG. 3 is an exemplary flow chart 300 illustrating operation of the computing device to generate an influence attribution recommendation. The process shown in FIG. 3 is performed by an attributions manager, executing on a computing device, such as the computing device 102 in FIG. 1, the user device 116 in FIG. 1, and/or the computing device 2000 of FIG. 20.

The process begins by calculating a first probability (P_a) a new communication is derived from historic knowledge of a first user at 302. The attributions manager calculates a second probability (P_b) that the new communication is derived from content in a second communication at 304. The second communication is a communication that was generated by a second user. The attributions manager makes a determination whether the second probability (P_b) is greater than the first probability (P_a) at 306. If no, influence by the second user is unlikely at 308. If the second probability is greater than the first probability, the attributions manager determines the second user communication likely influenced the first user's new communication at 310. The attributions manager generates an influence attribution recommendation at 312. The recommendation includes an attribution identifying the second user as an influencer of the first user. The recommendation can further include suggested future actions, such as provision of feedback to the users, suggested future collaboration of the users, etc. The process terminates thereafter.

While the operations illustrated in FIG. 3 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 3.

FIG. 4 is an exemplary flow chart 400 illustrating operation of the computing device to generate probabilities of influence on communications. The process shown in FIG. 4 is performed by an attributions manager, executing on a computing device, such as the computing device 102 in FIG. 1, the user device 116 in FIG. 1, and/or the computing device 2000 of FIG. 20.

The process begins by receiving embeddings for a new communication at 402. The attributions manager applies K-S statistics to the embeddings at 404. The attributions manager generates estimated probabilities (P_a) and (P_b) for samples at 406. The samples include the new communication embeddings and sample embeddings of the user's historical knowledge. The attributions manager determines if the second probability of influence by the second user (P_b) is greater than the first probability that the new communication is a result of the first user's prior knowledge (P_a) at 408. If yes, the attributions manager generates an influence attribution notification at 410. The notification is a notice or other message indicating the probable influence of the second user. the attributions manager outputs the notification to the appropriate user(s) at 412. The user(s) can include only the first user, only the second user, both the first and second user, a third user, or any other combinations of users. The process terminates thereafter.

While the operations illustrated in FIG. 4 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 4.

FIG. 5 is an exemplary flow chart 500 illustrating operation of the computing device to generate probabilities of influence associated with a new communication. The process shown in FIG. 5 is performed by an attributions manager, executing on a computing device, such as the computing device 102 in FIG. 1, the user device 116 in FIG. 1, and/or the computing device 2000 of FIG. 20.

The process begins by generating a plurality of embeddings representing prior communications of the first user at 502. The embeddings are generated by a natural language model, such as, but not limited to, the NLP model 126 in FIG. 1 and FIG. 2. The NLP model generates embeddings of communications by a second user shared with the first user at 504. A communication is shared if the first user read it, heard it, or otherwise accessed a portion of the content of the communication. A determination is made whether the first user generates a new communication at 506. If yes, the NLP model generates embeddings of the new communication at 508. The attributions manager applies multidimensional statistics on the embeddings at 510. Probabilities of influences on the new communication are generated at 512. The probabilities are compared to determine whether the new communications were likely the result of the user's historical knowledge or whether the new communication was likely influenced by communications from the second user. The process terminates thereafter.

While the operations illustrated in FIG. 5 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 5.

In some examples, the system represents people as lists or time series of Turing embeddings, where each embedding represent text, the users have written or read. High-dimensional Kolmogorov-Smirnov statistics are used to calculate a probability that an event or person influenced a person as measured by the next actions—writing or reading—that the person does. This can allow for measuring who influences each user, how does each user influence in turn and what part of a communication is most influential. The attributions manager creates a probability graph through time representing who is influenced by whom. A probability graph through time is created to represent what is influential, such as which portions of text or other communication read or heard is most influential.

The influential portions of the text can be highlighted or otherwise augmented to make the influential portion easier to identify. In one example, text sections are highlighted or underlined in color-coded lines by estimated impact. In this example, the most influential portions can be highlighted in green while the less influential portion are highlighted in yellow, or any other suitable color-coding scheme.

In some examples, communications generated by a user are processed via an automatic speech recognition (ASR) that generates transcripts from audio of meetings. The embeddings are generated using the transcripts. The embeddings can be generated in real-time as the communications are generated or in batch at a predetermined time period or when a threshold number of communications are in storage and ready for embedding. Likewise, the distribution tests can be performed in real time and leveraged during a meeting for dynamic influence determinations. In other examples, the probabilities and influence determinations are made at a predetermined time or upon occurrence of a predetermined event, such as a user-specified data and time or passage of a predetermined time-period.

Figure 6:
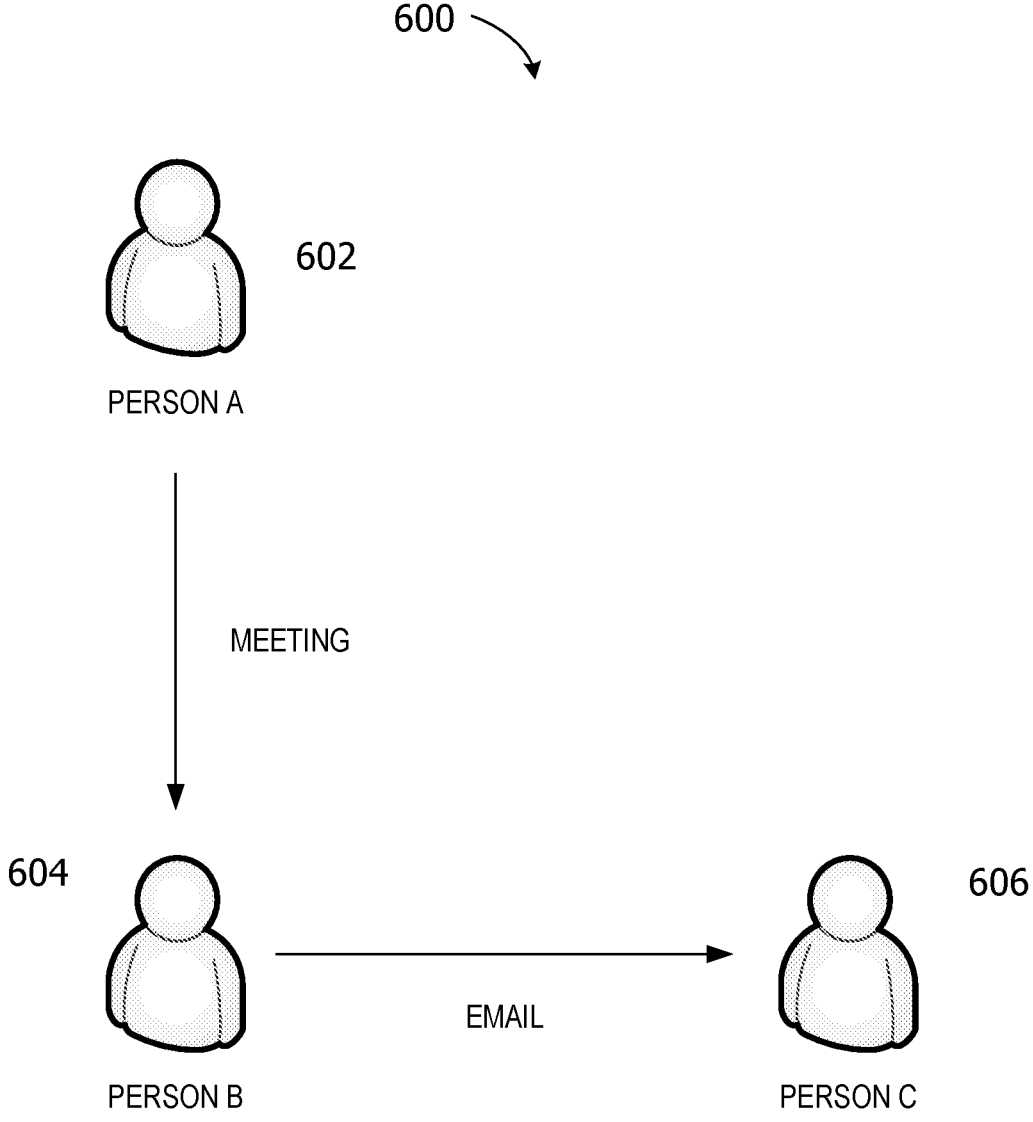
FIG. 6 is an exemplary block diagram illustrating a communication by a first person influencing a future communication generated by a second person.

Turning now to FIG. 6, an exemplary block diagram illustrating a communication by a first person influencing a future communication generated by a second person is depicted. In this example, a first user A 602 presents information and talks during a meeting which is attended by user B 604. The meeting audio is transcribed into text. Person B 604 later sends an email to person C 606. The attributions manager analyzes embeddings of the transcribed meeting communications and person B's knowledge list of Turing embeddings to determine if the email communication content is from person B's own prior knowledge or influenced by person A's presentation.

Figure 7:
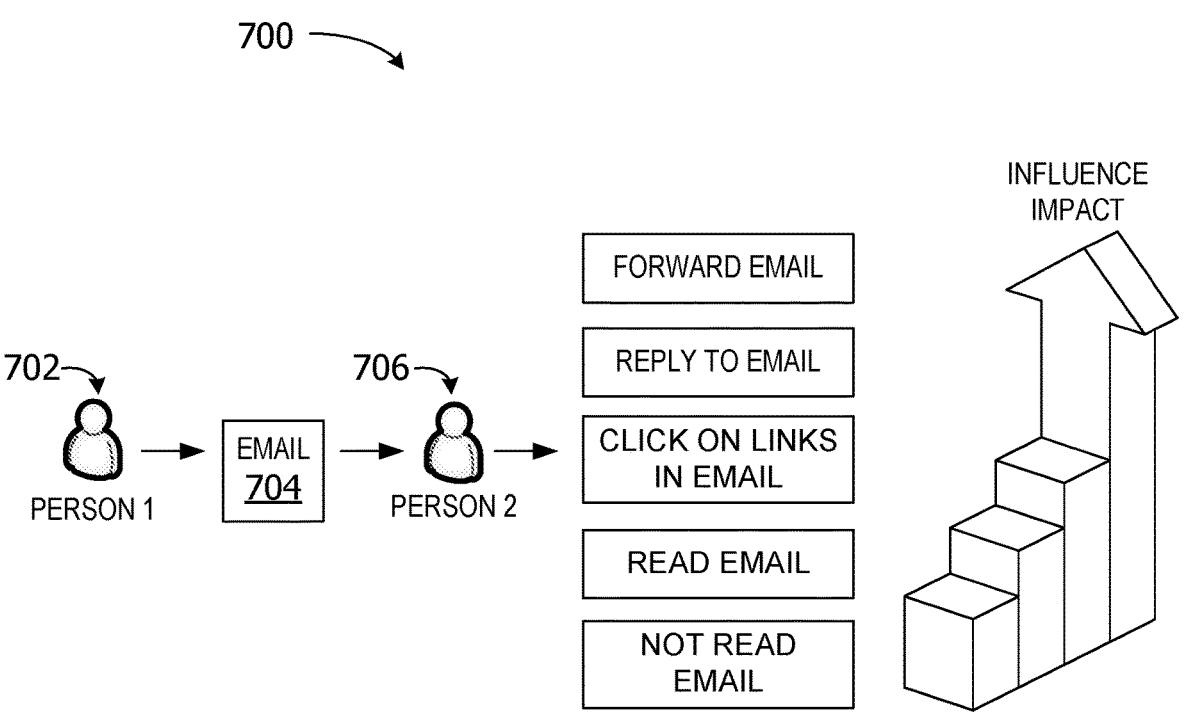
FIG. 7 is an exemplary block diagram illustrating degrees of influence.

FIG. 7 is an exemplary block diagram illustrating degrees of influence. In this example, person 702 sends an email communication to person 706. The influence of the email communication on person 706 can be measured in part based on the follow up actions of person 706. Follow-up actions can include reading the email, clicking on link(s) in the email, forwarding the email, adding others to the conversation thread, inviting others to a meeting to discuss an item in the email, generating a new related communication, generating one or more documents related to an item in the email communication, etc. These actions taken by other based on the communication can be used as indicators of influence and the degree of influence.

Figure 8:
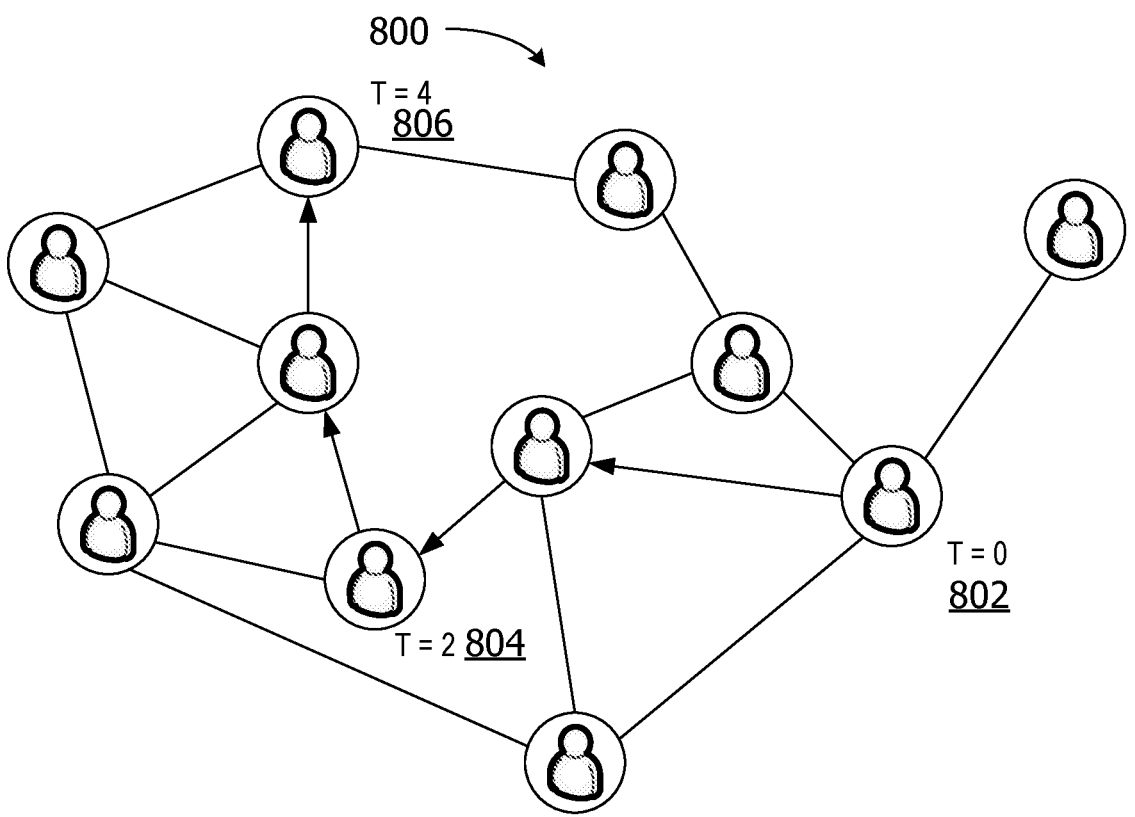
FIG. 8 is an exemplary graph illustrating chronological influence through a graph.

FIG. 8 is an exemplary graph illustrating chronological influence through a graph 800. The graph 800 is a graph which is optionally included in a recommendation associated with an influential communication. The graph 800 illustrates propagation of an ideal through a chain of users. In this example, an idea in a communication generated by a user at 802 is propagated through several other persons at 804. The idea continues propagating through additional users at 806. The number of users interacting with the communication content is an indicator of influence. The graph also illustrates how the content is propagated and through whom the idea is propagated.

Figure 9:
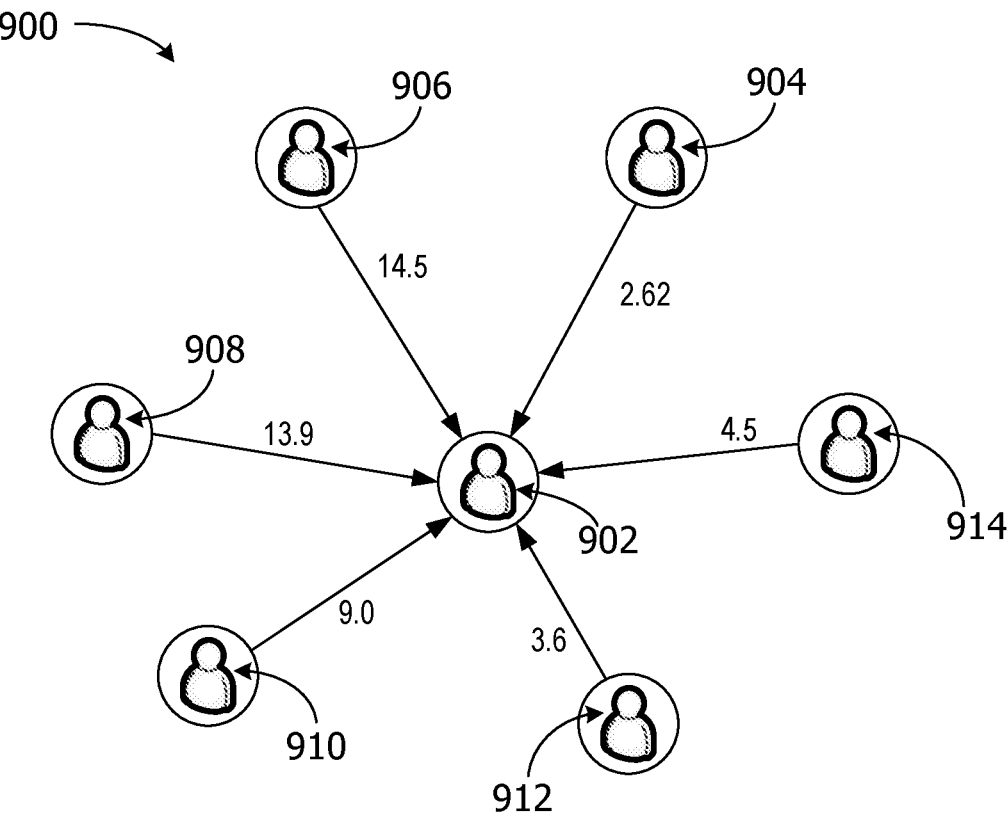
FIG. 9 is an exemplary graph illustrating influencers on a selected user.

Turning now to FIG. 9, an exemplary graph 900 illustrating influencers on a selected user is shown. The graph 900 depicts percentage values or scores indicating which people are most influential to a selected user 902. For example, user 904 has a score of 2.62 indicating a fairly low level of influence as compared to user 906 with a score of 14.5, user 908 with a score of 13.9, and user 910 with a score of 9.0. The user 912 has a score of 3.6. User 914 has the highest influence of 45. The score or ranking indicates which users generate content or communications which have the most influence on the selected user.

Figure 10:
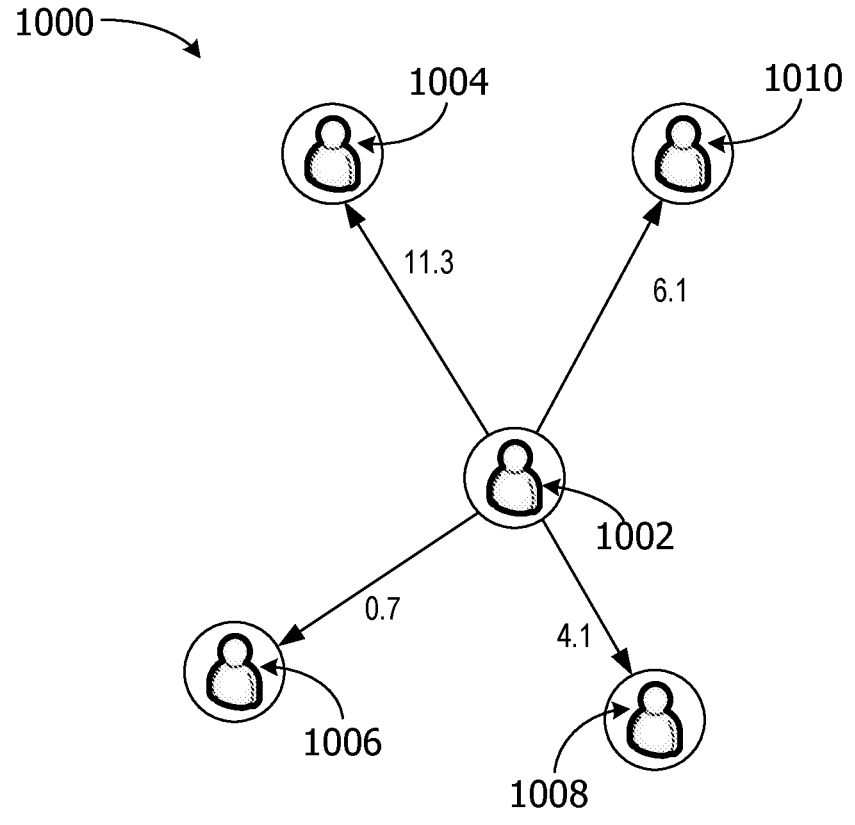
FIG. 10 is an exemplary graph illustrating users influenced by a selected user.

FIG. 10 is an exemplary graph 1000 illustrating users influenced by a selected user. In this example, the graph 1000 illustrates which users are influenced by the user 1002 and provides a score or percentage value measuring or ranking the level of influence. In this example, the user 1004 has a fairly high level of influence at 11.3 while user 1006 has a fairly low level of influence at 0.7. Other users 1008 and 1010 have more moderate scores of 4.1 and 6.1, indicating they are less influenced by the user 1002 than is user 1004.

Referring to FIG. 11, an exemplary table 1100 illustrating measuring influence by content similarity is shown. The table 1100 illustrates events along a timeline which may be relevant to determining influence. In this example, events associated with user exposure to various communications prior to the user generating a new communication are shown along the timeline. The prior events and communications may be potential influencers on the new communication at time zero.

In some examples, the attributes probabilities and recommendation(s) can be surfaced through various applications, such as user data feeds, as insights, as analytics, reports, graphs, or other output. The results can be used to detect who influenced a given user and what influenced the given user, such as which meeting participant or which document influenced the user. The probabilities can be used to create detailed reports describing those influences and/or provide feedback, such as those shown in FIGS. 12-19 below.

Figure 12:
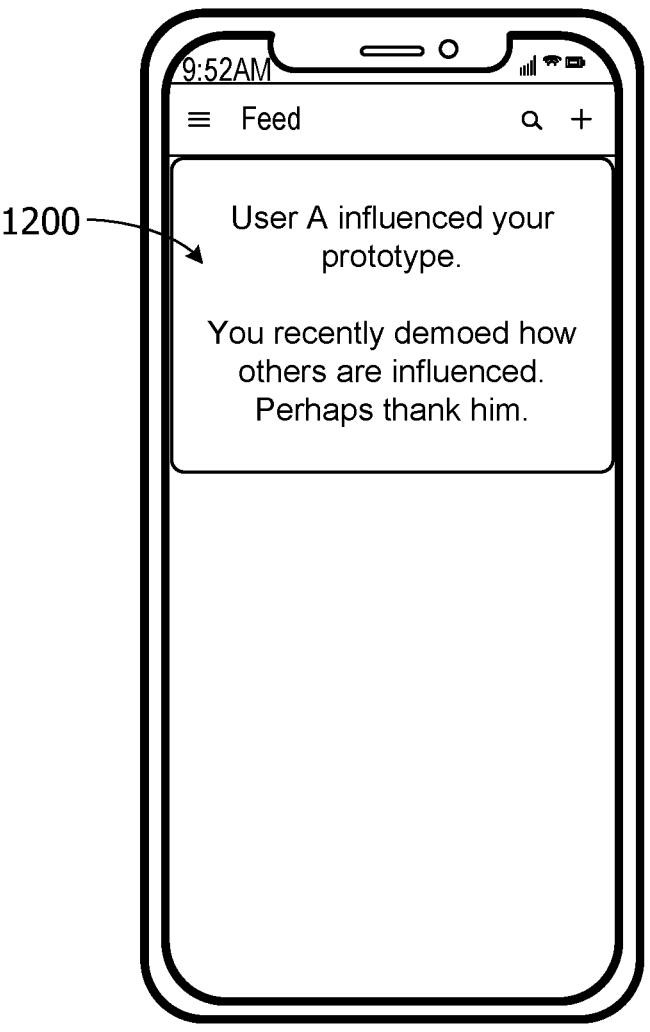
FIG. 12 is an exemplary block diagram illustrating a user interface (UI) displaying feedback to a user.

FIG. 12 is an exemplary block diagram illustrating a user interface (UI) 1200 displaying feedback to a user. In this example, the recommendation generated by the attributions manager includes an influence attributions identifying a person that influenced a prototype that another team is working on. The recommendation includes a suggestion to provide feedback to the influencer expressing thanks to the influencer.

Figure 13:
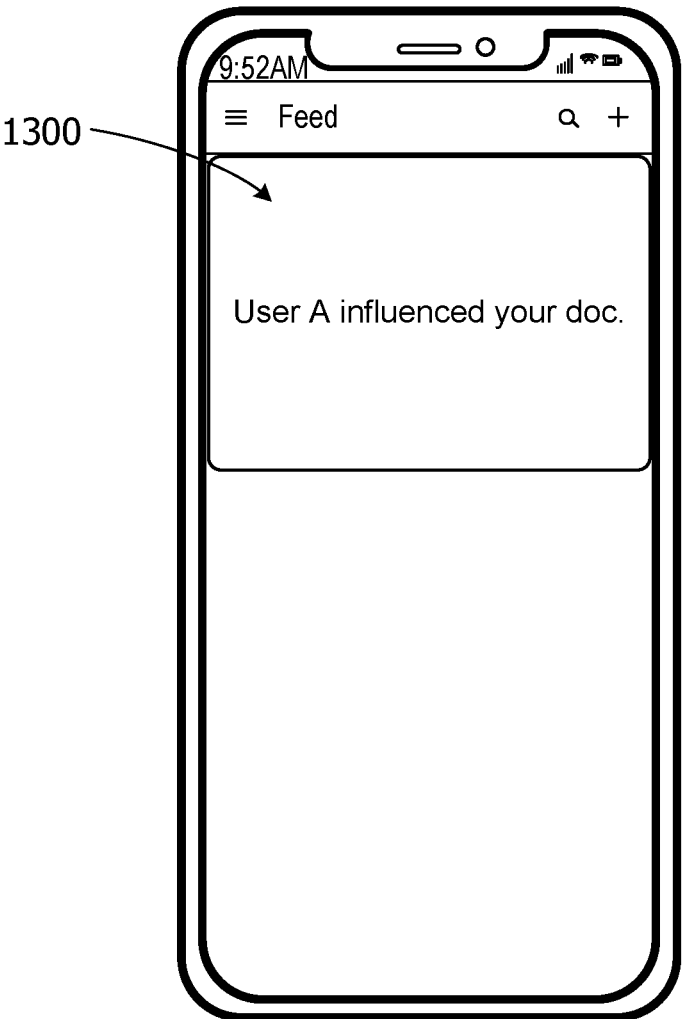
FIG. 13 is an exemplary block diagram illustrating a UI displaying influence attribution to a user.

FIG. 13 is an exemplary block diagram illustrating a UI 1300 displaying influence attribution to a user. In this example, the recommendation generated by the attributions manager includes an identification of the influencer that influenced a document. The recommendation includes a suggestion that the recipient of the recommendation keep the influencer in the loop regarding developments related to this document.

Figure 14:
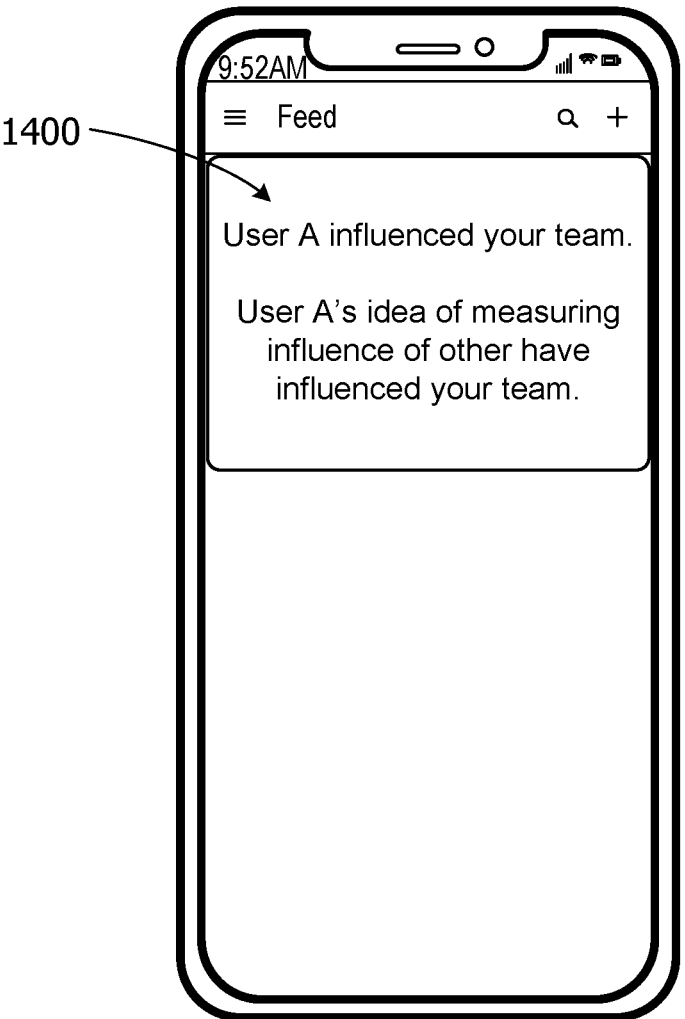
FIG. 14 is an exemplary block diagram illustrating a UI displaying influence attribution to a team manager.

FIG. 14 is an exemplary block diagram illustrating a UI 1400 displaying influence attribution to a team manager. In this example, the recommendation generated by the attributions manager includes an identification of an influencer that influenced a team. The recommendation includes a recommendation to provide feedback to both the influencer and the influencer's manager regarding the contributions made by the influencer.

FIG. 15 is an exemplary block diagram illustrating a UI 1500 displaying information describing who influences what within a team. In this example, the recommendation includes a list of which users influence what teams, documents, topics, etc. For example, one user influences the team on AI graph while another user influences the team on ML. This enables identification of team members that have are having the most impact and identification of which aspects of the team are being influenced by each team member.

Figure 17:
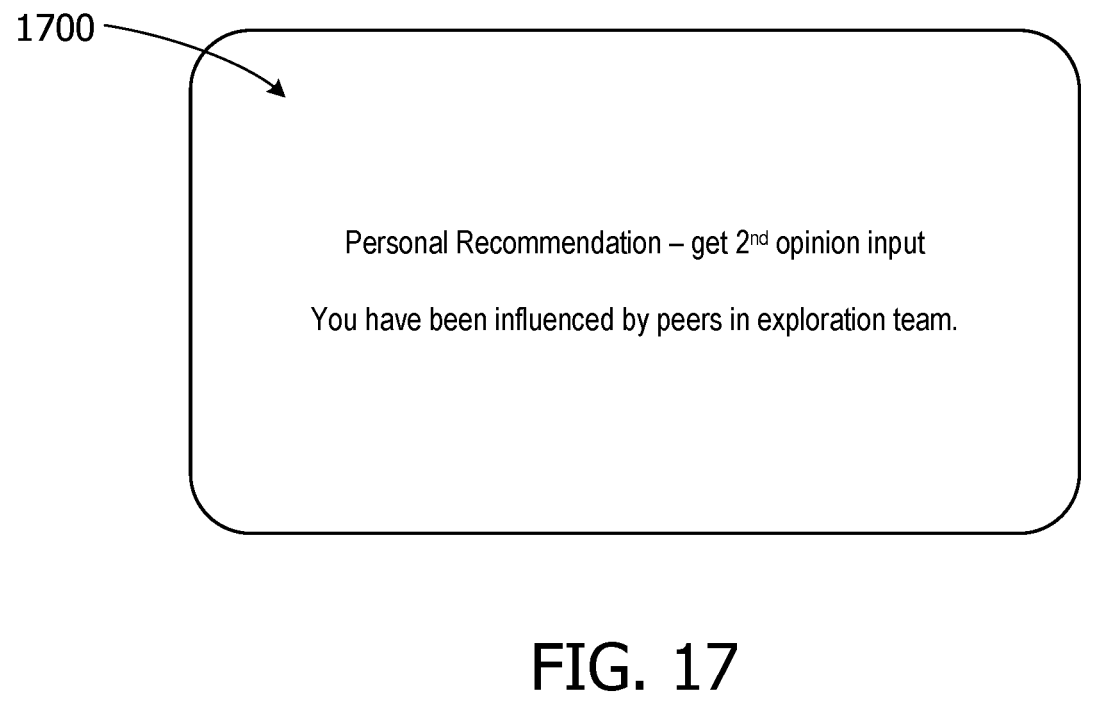

Referring now to FIG. 16, an exemplary block diagram illustrating a UI 1600 displaying information describing how a team influences the rest of an organization is shown. FIG. 17 is also an exemplary block diagram illustrating a UI 1700 displaying information describing a recommendation. These UIs provide additional influence information enabling improved communications and more efficient collaboration among team members and other users.

In some examples, the attributions manager highlights or summarizes text sections of a document or other communication that influenced the most people. This can be visualized in a document or other display as color-coded lines, italicized text, underlined text, text in a box, or any other text or font modifications that set-off or otherwise distinguish significant words, sentences, or sections of text in a communication.

Figure 18:
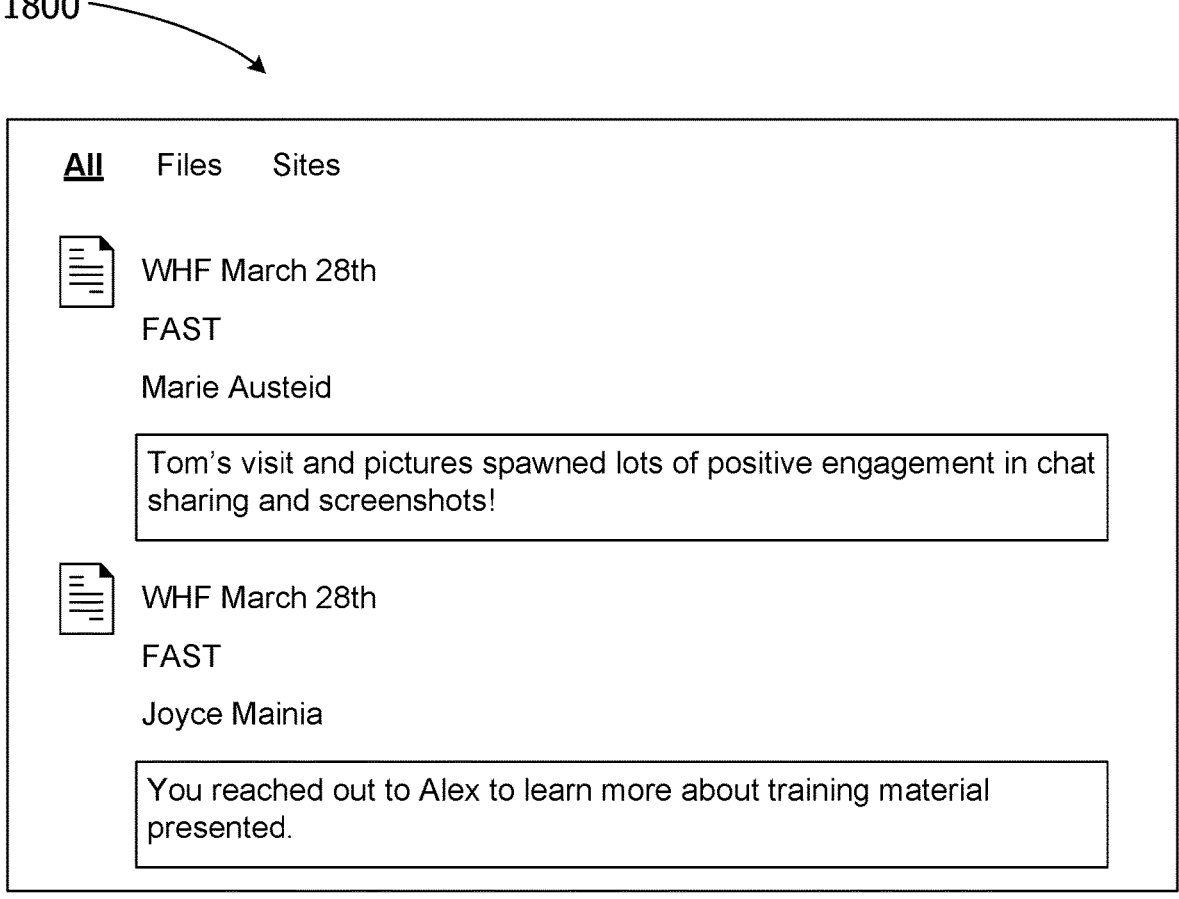
FIG. 18 is an exemplary block diagram illustrating a UI displaying a summary of influential actions associated with a user.

Referring now to FIG. 18, an exemplary block diagram illustrating a UI 1800 displaying a summary of influential actions associated with a user is shown. In this example, influential portions of text are enclosed within a box to set-off the text. The most impactful text is enclosed. The author of the most impactful text can also be highlighted. A text portion or snippet may be more impactful or influential if it led to additional communications, new ideas or other action being taken by one or more other users.

Figure 19:
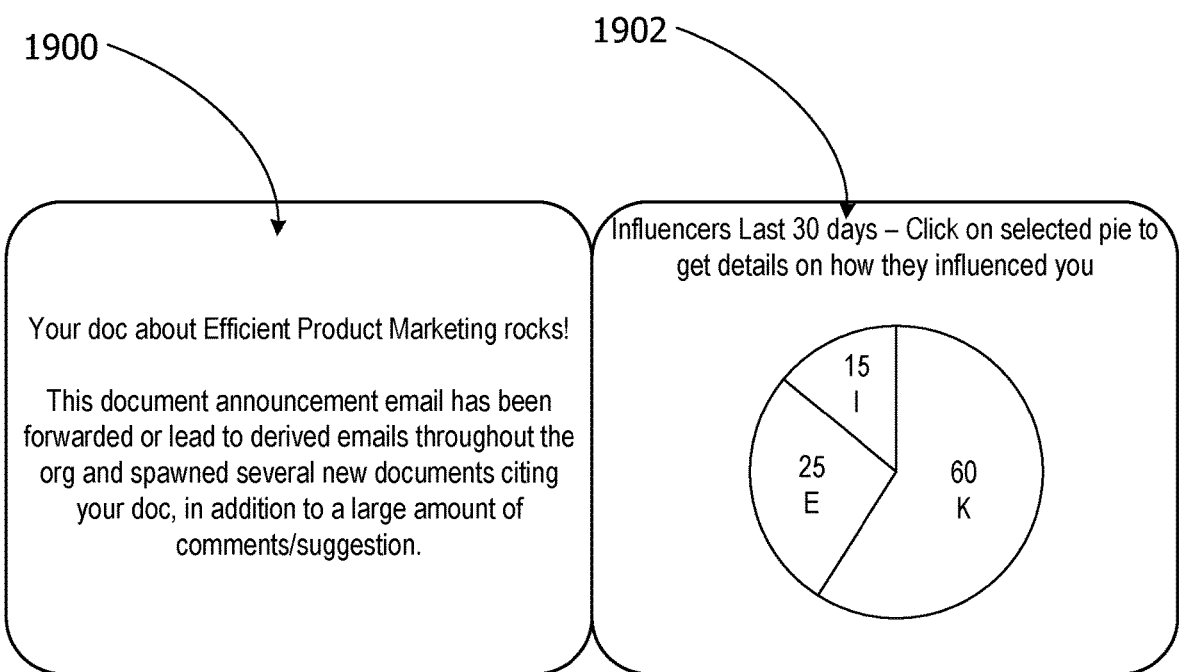
FIG. 19 is an exemplary block diagram illustrating a UI displaying feedback and a pie chart displaying influencers associated with a given user within a predetermined period of time.

FIG. 19 is an exemplary block diagram illustrating a UI 1900 displaying feedback and a pie chart displaying influencers associated with a given user within a predetermined period of time. The user can optionally click on the sections of the pie chart to obtain additional information about the user that has the most influence, the user having the least influence, etc.

ADDITIONAL EXAMPLES

The system in some examples, optionally includes one or more filters for filtering communications based on topic, classification, keyword, or other attributes. For example, the system may filter communications to eliminate any communications associated with vacations or vacation time. In this manner, resource usage is reduced by eliminating communications which are less likely to be relevant from consideration during influence attribute determinations.

In some examples, the recommendation includes recommendations for a user to follow or contact another user that might be a topical influencer, role model influencer or other influencer of interest. For example, if a user A is an authority on sustainability and user B is interested in sustainability, the attributions manager provides a recommendation suggesting user B reach out to user A, look at what user A is working on, read what user A has written, etc.

In an example scenario, the recommendation provided to user B might include the phrase "User A is an expert on topic X for reason Y." Another recommendation might state "User A is a topical influencer on subject X. Perhaps you should reach out to user A."

In an example scenario, if a user A heard about an idea from user B and sends a summary of it to user C. If user C writes it up in a document, there is likely to be changes from the original idea to the content that is written in the document by user C. However, the essence of the idea may be preserved. With NLP based embeddings, the system can measure how close the document written by user C is to the initial idea communicated by user B. Kolmogorov-Smirnov statistics can be used to measure if a sample is from a distribution. This type of statistic has also recently been developed for high-dimensional vectors—such as embeddings, and by combining embeddings and high-dimensional Kolmogorov Smirnov, the system generates an estimate of whether a person was influenced by a particular type of content or not. This can allow for measuring who is influenced by whom and create a probability graph through time for it. It also allows for measuring who is influenced by what and create a probability graph through time for it. Detecting what document or meeting influenced a user can assist in determining what leads to action and what is most effective.

In another example scenario, a speaker S talks for twenty minutes in a meeting attended by listeners Q, R and T. The system generates N Turing embeddings representing the sentences from the transcript, including text related slides and dwell time for those. The system analyzes communications by Q, R and T for the next predetermined time-period, such as forty-eight hours, after the meeting to determine if they were using text that is most likely to originate from S rather than from their own Turning embeddings representing historical knowledge.

For one-dimensional data, e.g., two list of numbers—one can use a Kolmogorov-Smirnov test to check the likelihood that the numbers are from same distribution ("goodness of fit"). The challenge with sentence embedding data is that it is of higher resolution (hundreds of dimensions), but one could perhaps do dimensionality reduction of embeddings down to 2D or 1D and then use Kolmogorov-Smirnov test to calculate a probability score for whether the lower dimensional embeddings origin from S or Q.

In still other examples, the influence attributions can be used to detect cheating and plagiarism. By comparing sentences or other communications generated by a student or author with the prior knowledge, a probability that the writing comes from the student/author's own knowledge can be calculated.

Alternatively, or in addition to the other examples described herein, examples include any combination of the following:

generate a plurality of semantic embeddings representing a plurality of prior communications generated by the first user;

the plurality of prior communications comprising transcripts of meetings attended by the first user, emails generated by the first user, documents authored by the first user and messages written by the first user;

wherein the plurality of semantic embeddings is stored in a remote data storage;

apply a Kolmogorov-Smirnov statistics test to estimate the probability that the first communication is from the same distribution as the historic knowledge of the first user;

apply Kolmogorov-Smirnov statistics test to estimate the probability that the first communication is from the same distribution as the second communication of the second user;

represent communications associated with a user as a timeline of semantic embeddings;

generate a graph representing propagation of influence associated with a plurality of users;

generate an influence attribution report identifying influencers on the first user and influences the first user has had on other users based on influence attribution associated with a plurality of communications generated by a plurality of users;

obtaining semantic embeddings representing a new communication generated by a first user at a first time period;

calculating a first estimated probability a portion of content associated with the new communication is derived from historic knowledge of the first user based on analysis of the semantic embeddings of the new communication and the semantic embeddings representing prior communications of the first user associated with the historic knowledge of the first user;

receiving semantic embeddings representing a second communication generated by a second user at a second time period, the second time period occurring prior to the first time period, wherein the second communication was accessible to the first user prior to generation of the new communication by the first user;

calculating a second estimated probability the content of the new communication generated by the first user is influenced by the second communication generated by the second user;

determining if the second estimated probability is greater than the first estimated probability;

generating an influence attribution recommendation, including an influence acknowledgment of the second user, responsive to a determination the second estimated probability exceeding the first estimated probability;

generating a plurality of semantic embeddings representing a plurality of prior communications generated by the first user, the plurality of prior communications comprising transcripts of meetings attended by the first user, emails generated by the first user, documents authored by the first user and messages written by the first user, wherein the plurality of semantic embeddings are stored in a remote data storage;

using a Kolmogorov-Smirnov statistics test to estimate the probability that the first communication is from the same distribution as the historic knowledge of the first user;

using a Kolmogorov-Smirnov statistics test to estimate the probability that the first communication is from the same distribution as the second communication of the second user;

representing communications associated with a user as a timeline of semantic embeddings;

generating a graph representing propagation of influence associated with a plurality of users;

identifying influencers on the first user and influences the first user has had on other users based on influence attribution associated with a plurality of communications generated by a plurality of users;

generating semantic embeddings representing a new communication generated by a first user at a first time period;

calculating a first estimated probability a portion of content associated with the new communication is derived from historic knowledge of the first user using multidimensional statistics on the semantic embeddings of the new communication and the semantic embeddings representing prior communications of the first user associated with the historic knowledge of the first user;

generating semantic embeddings representing a second communication generated by a second user at a second time period, the second time period occurring prior to the first time period, wherein the second communication was accessible to the first user prior to generation of the new communication by the first user;

calculating a second estimated probability the content of the new communication generated by the first user is influenced by the second communication generated by the second user based on a using the multidimensional statistics on the semantic embeddings representing the new communication and the semantic embeddings representing the second communication;

generating an influence attribution recommendation, including an influence acknowledgment of the second user, responsive to a determination the second estimated probability exceeding the first estimated probability;

generating a plurality of semantic embeddings representing a plurality of prior communications generated by the first user, the plurality of prior communications comprising transcripts of meetings attended by the first user, emails generated by the first user, documents authored by the first user and messages written by the first user, wherein the plurality of semantic embeddings are stored in a remote data storage;

applying a Kolmogorov-Smirnov statistics test to estimate the probability that the first communication is from the same distribution as the historic knowledge of the first user;

applying Kolmogorov-Smirnov statistics test to estimate the probability that the first communication is from the same distribution as the second communication of the second user;

generating a first timeline of semantic embeddings representing communications associated with the first user;

generating a second timeline of semantic embeddings representing communications associated with the second user, wherein the timelines of semantic embeddings are utilized to measure probability of influence on communications of the first user and the second user; and generate a graph representing propagation of an idea associated with a plurality of users based on influence attribution.

Figure 20:
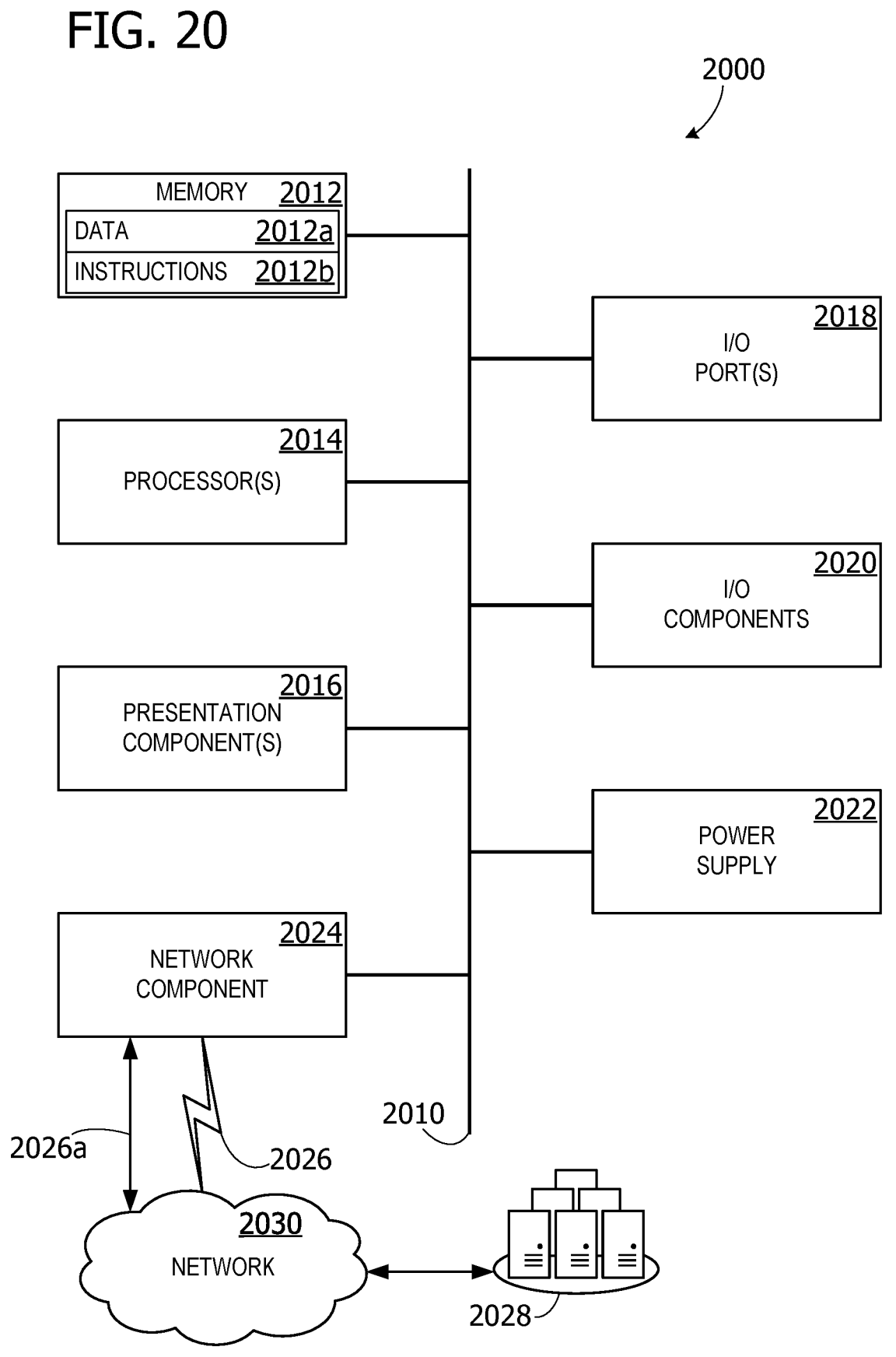

At least a portion of the functionality of the various elements in FIG. 1, FIG. 2 and FIG. 20 can be performed by other elements in FIG. 1, FIG. 2 and FIG. 20, or an entity (e.g., processor 106, web service, server, application program, computing device, etc.) not shown in FIG. 1, FIG. 2, and FIG. 20.

In some examples, the operations illustrated in FIG. 3, FIG. 4 and FIG. 5 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of calculating probability of influence on communications, the method comprising calculating a first probability a portion of content associated with a first communication generated by a first user is derived from historic knowledge of the first user, the historic knowledge of the first user comprising semantic embeddings representing prior communications associated with the first user; calculating a second probability the portion of the content associated with the first communication generated by the first user is derived in part from content of a second communication generated by a second user prior generation of the first communication by the first user, wherein the first user interacted with the second communication prior to generation of the first communication; and generating an influence attribution recommendation, including an influence attribution acknowledging influence of the second user, responsive to the second estimated probability exceeding the first estimated probability.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

While no personally identifiable information is tracked by aspects of the disclosure, examples have been described with reference to data monitored and/or collected from the users. In some examples, notice is provided to the users of the collection of the data (e.g., via a dialog box or preference setting) and users are given the opportunity to give or deny consent for the monitoring and/or collection. The consent can take the form of opt-in consent or opt-out consent.

ADDITIONAL EXAMPLES

FIG. 20 is a block diagram of an example computing device 2000 for implementing aspects disclosed herein and is designated generally as computing device 2000. The computing device 2000 is a computing device, such as, but not limited to, the user device 116 in FIG. 1 and/or the computing device 102 in FIG. 1. Computing device 2000 is an example of a suitable computing environment and is not intended to suggest any limitation as to the scope of use or functionality of the examples disclosed herein. Neither should compute device 2000 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device.

Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 2000 includes a bus 2010 that directly or indirectly couples the following devices: computer-storage memory 2012, one or more processors 2014, one or more presentation components 2016, I/O ports 2018, I/O components 2020, a power supply 2022, and a network component 2024. While computing device 2000 is depicted as a seemingly single device, multiple computing devices 2000 may work together and share the depicted device resources. For example, memory 2012 may be distributed across multiple devices, and processor(s) 2014 may be housed with different devices.

Bus 2010 represents what may be one or more busses (such as an address bus, data bus, or a combination thereof). Although the various blocks of FIG. 20 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 20 and the references herein to a "computing device."

Memory 2012 may take the form of the computer-storage media references below and operatively provide storage of computer-readable instructions, data structures, program modules and other data for computing device 2000. In some examples, memory 2012 stores one or more of an operating system, a universal application platform, or other program modules and program data. Memory 2012 is thus able to store and access data 2012*a* and instructions 2012*b* that are executable by processor 2014 and configured to carry out the various operations disclosed herein.

In some examples, memory 2012 includes computer-storage media in the form of volatile and/or nonvolatile memory, removable or non-removable memory, data disks in virtual environments, or a combination thereof. Memory 2012 may include any quantity of memory associated with or accessible by computing device 2000. Memory 2012 may be internal to computing device 2000 (as shown in FIG. 20), external to computing device 2000 (not shown), or both (not shown).

Examples of memory 2012 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 2000. Additionally, or alternatively, memory 2012 may be distributed across multiple computing devices 2000, for example, in a virtualized environment in which instruction processing is carried out on multiple computing devices 2000. For the purposes of this disclosure, "computer storage media," "computer storage device," "computer-storage memory," "memory," and "memory devices" are synonymous terms for computer-storage memory 2012, and none of these terms include carrier waves or propagating signaling.

Processor(s) 2014 may include any quantity of processing units that read data from various entities, such as memory 2012 or I/O components 2020 and may include CPUs and/or GPUs. Specifically, processor(s) 2014 are programmed to execute computer-executable instructions for implementing aspects of the disclosure. The instructions may be performed by the processor, by multiple processors within computing device 2000, or by a processor external to client computing device 2000. In some examples, processor(s) 2014 are programmed to execute instructions such as those illustrated in the in the accompanying drawings.

Moreover, in some examples, processor(s) 2014 represent an implementation of analog techniques to perform the operations described herein. For example, the operations may be performed by an analog client computing device 2000 and/or a digital client computing device 2000. Presentation component(s) 2016 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 2000, across a wired connection, or in other ways. I/O ports 1618 allow computing device 2000 to be logically coupled to other devices including I/O components 2020, some of which may be built in. Example I/O components 2020 include, for example but without limitation, a microphone, joystick, game pad, satellite dish, scanner, printer, wireless device, etc.

Computing device 2000 may operate in a networked environment via network component 2024 using logical connections to one or more remote computers. In some examples, network component 2024 includes a network interface card and/or computer-executable instructions (e.g., a driver) for operating the network interface card. Communication between computing device 2000 and other devices may occur using any protocol or mechanism over any wired or wireless connection.

In some examples, network component 2024 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 2024 communicates over wireless communication link 2026 and/or a wired communication link 2026a to a cloud resource 2028 across network 2030. Various different examples of communication links 2026 and 2026a include a wireless connection, a wired connection, and/or a dedicated link, and in some examples, at least a portion is routed through the internet.

Although described in connection with an example computing device 2000, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types.

Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for measuring probability of influence in communications, the system comprising:

a processor; and a memory comprising computer-readable instructions, the memory and the computer-readable instructions configured to cause the processor to:

calculate a first probability that a first content associated with a first communication generated by a first user is derived from historic knowledge of the first user using semantic embeddings of prior communications associated with the historic knowledge of the first user, the semantic embeddings generated by a natural language processing model;

calculate a second probability that the first content associated with the first communication generated by the first user is derived in part from a second content of a second communication generated by a second user, the second communication generated prior to the first communication, the second communication occurring within a user-configurable time period prior to the first communication, wherein the first user interacted with the second communication prior to generation of the first communication;

determine whether the second probability is greater than the first probability;

generate an influence attribution recommendation, including an influence attribution of the second user, responsive to a determination that the second probability is greater than the first probability, wherein the influence attribution recommendation is presented to the first user via a user interface;

present the influence attribution recommendation to the first user via a user interface, the influence attribution recommendation comprising the second communication; and suggest the first user send a message to the second user acknowledging a contribution of the second content to the first content.

2. The system of claim 1, wherein the instructions are further operative to:

generate a plurality of semantic embeddings representing a plurality of prior communications generated by the first user, the plurality of prior communications comprising transcripts of meetings attended by the first user, emails generated by the first user, documents authored by the first user and messages written by the first user, wherein the plurality of semantic embeddings are stored in a remote data storage.

3. The system of claim 1, wherein the instructions are further operative to:

apply a Kolmogorov-Smirnov statistics test to estimate the probability that the first communication is from a same distribution as the historic knowledge of the first user.

4. The system of claim 1, wherein the instructions are further operative to:

apply Kolmogorov-Smirnov statistics test to estimate the probability that the first communication is from a same distribution as the second communication of the second user.

5. The system of claim 1, wherein the instructions are further operative to:

represent communications associated with a user as a timeline of semantic embeddings.

6. The system of claim 1, wherein the instructions are further operative to:

generate a graph representing propagation of influence associated with a plurality of users.

7. The system of claim 1, wherein the instructions are further operative to:

generate an influence attribution report identifying influencers on the first user and influences the first user has had on other users based on influence attribution associated with a plurality of communications generated by a plurality of users.

8. A method for measuring probability of influence in communications, the method comprising:

obtaining first semantic embeddings representing a new communication generated by a first user at a first time, the first semantic embeddings generated by a natural language processing model;

calculating a first probability that a first portion of content associated with the new communication is derived from historic knowledge of the first user based on analysis of the first semantic embeddings of the new communication and second semantic embeddings representing prior communications of the first user associated with the historic knowledge of the first user, the second semantic embeddings generated by a natural language processing model;

receiving third semantic embeddings representing a second communication generated by a second user at a second time, the second time occurring prior to the first time, wherein the second communication was accessible to the first user prior to generation of the new communication by the first user, the third semantic embeddings generated by the natural language processing model;

calculating a second probability that the content of the new communication is influenced by the second communication, the second communication occurring within a user-configurable time period prior to the new communication;

determining that the second probability is greater than the first probability;

generating an influence attribution recommendation, including an influence attribution of the second user, responsive to determining that the second probability exceeds the first probability;

presenting the influence attribution recommendation to the first user via a user interface, the influence attribution recommendation comprising the second communication; and suggesting the first user send a message to the second user acknowledging a contribution of the second communication to the new communication.

9. The method of claim 8, further comprising:

generating a plurality of semantic embeddings representing a plurality of prior communications generated by the first user, the plurality of prior communications comprising transcripts of meetings attended by the first user, emails generated by the first user, documents authored by the first user and messages written by the first user, wherein the plurality of semantic embeddings are stored in a remote data storage.

10. The method of claim 8, further comprising:

using a Kolmogorov-Smirnov statistics test to estimate the probability that the new communication is from a same distribution as the historic knowledge of the first user.

11. The method of claim 8, further comprising:

using a Kolmogorov-Smirnov statistics test to estimate the probability that the new communication is from a same distribution as the second communication of the second user.

12. The method of claim 8, further comprising:

representing communications associated with a user as a timeline of semantic embeddings.

13. The method of claim 8, further comprising:

generating a graph representing propagation of influence associated with a plurality of users.

14. The method of claim 8, further comprising:

identifying influencers on the first user and influences the first user has had on other users based on influence attribution associated with a plurality of communications generated by a plurality of users.

15. One or more computer storage devices having computer-executable instructions stored thereon for measuring probability of influence in communications, which, on execution by a computer, cause the computer to perform operations comprising:

generating first semantic embeddings representing a new communication generated by a first user at a first time, the first semantic embeddings generated by a natural language processing model;

calculating a first probability that a first portion of content associated with the new communication is derived from historic knowledge of the first user using multidimensional statistics on the first semantic embeddings and second semantic embeddings representing prior communications of the first user associated with the historic knowledge of the first user, the second semantic embeddings generated by a natural language processing model;

generating second semantic embeddings representing a second communication generated by a second user at a second time, the second time occurring prior to the first time, wherein the second communication was accessible to the first user prior to generation of the new communication by the first user, the second communication occurring within a user-configurable time period prior to the new communication;

calculating a second probability that the content of the new communication is influenced by the second communication based on the multidimensional statistics on the second semantic embeddings, the second communication occurring within a user-configurable time period prior to the new communication;

generating an influence attribution recommendation, including an influence attribution of the second user, responsive to determining that the second probability exceeds the first probability;

presenting the influence attribution recommendation to the first user via a user interface, the influence attribution recommendation comprising the second communication; and suggesting the first user send a message to the second user acknowledging a contribution of the second communication to the first portion of content.

16. The one or more computer storage devices of claim 15, wherein the operations further comprise:

generating a plurality of semantic embeddings representing a plurality of prior communications generated by the first user, the plurality of prior communications comprising transcripts of meetings attended by the first user, emails generated by the first user, documents authored by the first user and messages written by the first user, wherein the plurality of semantic embeddings are stored in a remote data storage.

17. The one or more computer storage devices of claim 15, wherein the operations further comprise:

applying a Kolmogorov-Smirnov statistics test to estimate the probability that the new communication is from a same distribution as the historic knowledge of the first user.

18. The one or more computer storage devices of claim 15, wherein the operations further comprise:

applying Kolmogorov-Smirnov statistics test to estimate the probability that the new communication is from a same distribution as the second communication.

19. The one or more computer storage devices of claim 15, wherein the operations further comprise:

generating a first timeline of semantic embeddings representing communications associated with the first user; and generating a second timeline of semantic embeddings representing communications associated with the second user, wherein the first and second timelines of semantic embeddings are utilized to measure probability of influence on communications of the first user and the second user.

20. The one or more computer storage devices of claim 15, wherein the operations further comprise:

generate a graph representing propagation of an idea associated with a plurality of users based on influence attribution.

* * * * *